(12) United States Patent
Novak et al.

(10) Patent No.: US 11,494,851 B1
(45) Date of Patent: Nov. 8, 2022

(54) MESSAGING SYSTEM AND METHOD FOR PROVIDING MANAGEMENT VIEWS

(71) Applicants: Ana Novak, Brighton (AU); Mathieu Julien Rainville Wells, Saint-Lazare (CA); Neil Teitelbaum, Ottawa (CA)

(72) Inventors: Ana Novak, Brighton (AU); Mathieu Julien Rainville Wells, Saint-Lazare (CA); Neil Teitelbaum, Ottawa (CA)

(73) Assignee: Winter Chat Pty Ltd., Brighton (AU)

( * ) Notice: Subject to any disclaimer, the term of this patent is extended or adjusted under 35 U.S.C. 154(b) by 0 days.

(21) Appl. No.: 17/749,322

(22) Filed: May 20, 2022

Related U.S. Application Data

(63) Continuation-in-part of application No. 17/345,041, filed on Jun. 11, 2021, now Pat. No. 11,341,337.

(51) Int. Cl.
 *G06F 40/30* (2020.01)
 *G06Q 50/00* (2012.01)
 *G06Q 10/06* (2012.01)

(52) U.S. Cl.
 CPC ............. *G06Q 50/01* (2013.01); *G06F 40/30* (2020.01); *G06Q 10/0633* (2013.01)

(58) Field of Classification Search
 CPC ..... G06F 40/30; G06Q 10/0633; G06Q 50/01
 See application file for complete search history.

(56) References Cited

U.S. PATENT DOCUMENTS

| | | | |
|---|---|---|---|
| 5,245,532 A * | 9/1993 | Mourier | ................ H04L 51/234 |
| | | | 700/90 |
| 2006/0080321 A1 | 4/2006 | Horn | |
| 2006/0104515 A1 | 5/2006 | King | |
| 2006/0156228 A1 | 7/2006 | Gallo | |
| 2006/0238383 A1 | 10/2006 | Kimchi | |
| 2008/0270389 A1 | 10/2008 | Jones | |
| 2009/0164904 A1 | 6/2009 | Horowitz | |
| 2010/0005152 A1 * | 1/2010 | Ramamurthy | ......... G06Q 10/10 |
| | | | 709/217 |
| 2010/0010987 A1 | 1/2010 | Smyth | |
| 2010/0030578 A1 | 2/2010 | Siddique | |
| 2010/0042619 A1 | 2/2010 | Jones | |
| 2012/0197898 A1 | 8/2012 | Pandey | |
| 2014/0337257 A1 | 11/2014 | Chatterjee | |
| 2015/0179165 A1 * | 6/2015 | Mohamed | ........... H04M 3/5133 |
| | | | 704/251 |
| 2016/0103923 A1 * | 4/2016 | Thomas | .............. G06F 16/9535 |
| | | | 715/234 |

(Continued)

*Primary Examiner* — Eric Yen

(57) ABSTRACT

A computer implemented messaging and management system for organizing and extracting information sent between users, and for automatically generating and updating management data based on information extracted from messages. One or more processors are configured to receive posts and post relational data and configured to generate a set of P-tags from the received posts and post relational data, wherein each P-tag has a value associated therewith, wherein some of the values are derived from users' input and wherein some of the values are generated by a tag management engine and a statistics engine. A logic engine having logic gates groups the P-tags or P-tags and keywords into a plurality of logic expressions; and, a compilation engine for creates and displays one or more management views in dependence upon at least some of the plurality of logic expressions.

16 Claims, 25 Drawing Sheets

(56) References Cited

U.S. PATENT DOCUMENTS

| | | |
|---|---|---|
| 2019/0163711 A1* | 5/2019 | Dhawan .............. G06F 16/9535 |
| 2019/0325398 A1* | 10/2019 | Das .................... G06Q 10/1053 |
| 2019/0327531 A1 | 10/2019 | Hundemer |
| 2019/0361937 A1 | 11/2019 | Rogynskyy |
| 2020/0287736 A1 | 9/2020 | Zhuk |
| 2020/0311120 A1* | 10/2020 | Zhao ................. G06F 16/90324 |
| 2021/0011967 A1 | 1/2021 | Rathod |
| 2021/0090449 A1 | 3/2021 | Smith |
| 2021/0248136 A1 | 8/2021 | Panuganty |

* cited by examiner

CREATING A METATAG

STEP 1

STEP 2

STEP 3

MESSAGING SYSTEM AND METHOD FOR PROVIDING MANAGEMENT VIEWS

CROSS-REFERENCE TO RELATED APPLICATIONS

The present application is a Continuation-in-part of U.S. patent application Ser. No. 17/345,041 filed on Jun. 11, 2021, which is being incorporated herein by reference in its entirety.

FIELD

The present disclosure relates generally to the field of groupware and communication software, and more specifically to a method and system for messaging, management, and summarization, using a combined user-post tag-based categorization system and rule-based filtering.

BACKGROUND

Messaging platforms have been employed and evolving for almost two decades. They allow users to communicate via digital messages—commonly referred to as "posts". These posts contain content in the form of text, graphics, sound or video, which is logically organized into discussion topics or channels and discussion threads. A discussion thread is defined as a short conversation which starts with a single post, that is followed by one or more "reply" posts presented in reverse chronological order. The challenge with existing systems is that outside of discussion channels and threads, which encapsulate or bind similar messages, few other enablers for organizing voluminous conversations exist. This is particularly challenging in messaging platforms which cater to business communication, where it is essential to rapidly find high value information in a growing repository of spontaneous user posts. Furthermore, these systems only permit sharing of low-level information or conclusions in the form of opinions. The transparency of the thinking or evaluation or judgement process that exists between the raw information and derived conclusions is often hidden. However, it is in this layer that miscommunication often occurs. To alleviate some of these problems, some systems have introduced tags as a means for classifying messages, such as labeling interesting, irrelevant or funny posts. However, these labels tend to be pre-imposed, somewhat limited in nature, and only address the very surface of the problem. Humanity is learning to learn together, identify and shed the subconscious judgement processes that lead to potential miscommunication and less optimal outcomes. The recent pandemic instigated a need for humanity to work together collaboratively in the face ambiguous, emergent realities and construct new forms of digital cooperation. Nevertheless, much improvement is still required in information management, consensus seeking, summarization of data, privacy considerations, and more, thus enabling human collaboration in online groups to evolve to the global and local needs at hand.

In recent years, Machine Learning algorithms are increasingly being utilized to automate manual tagging of multimedia content. For example, customer support software platforms can automatically classify sales representative—customer conversations based on a number of pre-defined, frequently occurring topics. Twitter™ is also a very good resource for text data, further providing an Application Programming Interface (API) through which to acquire stored data for anyone interested in data mining. A number of articles describe various NLP techniques and their respective efficiencies in assigning topics to tweets. However, one vital aspect is missing. Consider a familiar example of reading emails; one does not just absorb the content without first parsing for "who it is from". The credibility of a source of information also plays a vital role in the assessment of information. For example, information regarding COVID published in a medical journal, written by a Professor in medicine, would likely be more trusted than the information on the same topic published by a generic magazine. This disclosure considers user's profile and input as an additional source of information for organizing and retrieving desired content. Furthermore, beyond information sharing, the system disclosed here also provides a platform to collaborate on thinking behind human classification and evaluation of information. This information is particularly valuable, in the focused groups of experts striving to reach consensus in a range of domains, from policies setting in public and private arenas, to setting targets for machine learning algorithms driving automation in an ethical way.

BRIEF DESCRIPTION OF THE DRAWINGS

Exemplary embodiments will be described in accordance with the drawings in which.

SUMMARY

Figure 1:
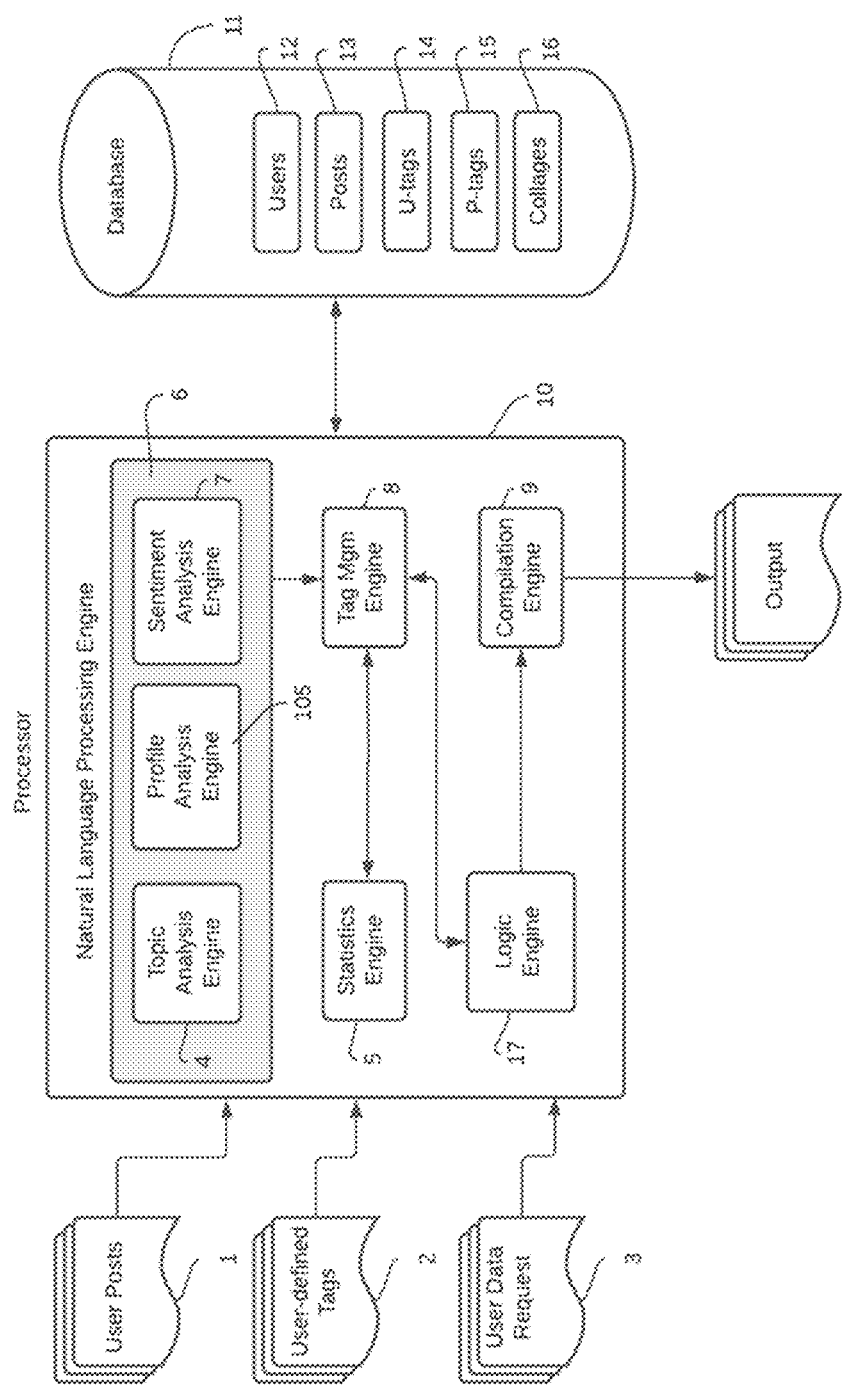
FIG. 1 is a computer system according to the disclosure.

In accordance with an aspect of this disclosure a computer implemented messaging system for organizing and extracting information from messages sent between users of the system is provided, comprising:

a plurality of storage devices;

a network interface in signal communication with the plurality of storage devices configured to receive and store data related to users and posts from users of the messaging system wherein a post is a message that comprises at least one of text, speech, graphics, and video, or any combination thereof, and configured to receive and store user-post-interaction data, wherein user-post-interaction data relates to information associating users with other users or other users' posts;

one or more processors configured to access the plurality of the posts, user-post-interaction data and the data related to users;

the one or more processors configured to generate a set of P-tags and a set of U-tags from the received posts and user-post-interaction data and the data related to users, wherein a P-tag is tag is associated with a post and a U-tag is a tag associated with a user, wherein the set of P-tags and the set of U-tags each have associated therewith a plurality of semantic classes, wherein a semantic class is logical grouping of tags, wherein each P-tag has a value associated therewith and each U-tag has a value associated therewith, wherein some of the values correspond to, or are derived from users' input and, wherein some of the values are generated by a machine learning NLP engine and a statistics engine and a tag management engine; and, wherein the one or more processors in dependence upon keywords and the generated values of P-tags and U-tags is configured to filter and extract information based on a query.

In accordance with another aspect of the disclosure a method of organizing and extracting information from messages is provided, comprising:

receiving and storing posts from users of the messaging system and data related to users of the messaging system, wherein a post is a message that comprises at least one of text, speech, graphics, and video, or any combination thereof and;

receiving and storing user-post-interaction data, wherein user-post-interaction data relates to information associating users of the messaging system with other users of the messaging system or other users' posts;

utilizing one or more processors to process the plurality of posts, user-post-interaction data and data related to users to create and attach a set of P-tags and a set of U-tags to the posts, user-post-interaction data and data related to users;

assigning a value to each P-tag and assigning a value to each U-tag, wherein some of the values correspond to, or are derived from a users' input and, wherein some of the values are generated by a machine learning NLP engine and a statistics engine and a tag management engine; and, filtering and extracting information with the one or more processors in dependence upon keywords and the generated values of P-tags and U-tags.

In accordance with yet another aspect there is provided a non-transitory computer readable medium comprising program instructions stored thereon for extracting information from messages and for causing a computer system having one or more processors and storage devices to:

receive and store data related to users and posts from users of the messaging system wherein a post is a message that comprises at least one of text, speech, graphics, and video, or any combination thereof and configured to receive and store user-post-interaction data, wherein user-post-interaction data relates to information associating users with other users or other users posts;

access the plurality of user posts, user-post-interaction data and data related to users;

generate a set of P-tags and a set of U-tags from the received user posts and user-post-interaction data and the data related to users, wherein a P-tag is tag associated with a post and a U-tag is a tag associated with a user, wherein the set of P-tags and the set of U-tags each have associated therewith a plurality of semantic classes, wherein a semantic class is logical grouping of tag;

generate values using a machine learning NLP engine, and a statistics engine and a tag management engine;

receive values from users;

associate a plurality of the generated and received values with a plurality of P-tags and U-tags; and, filter and extract information based on a query, in dependence upon keywords and the values associated with P-tags and U-tags.

In another aspect of the disclosure, a method for extracting and organizing information comprises:

receiving original information via a network from a plurality of users;

storing the original information;

using a processor to augment the original information by automatically acquiring and analyzing found information from the web wherein the found information is based on some of the content of the original information and analyzing the original information, wherein analyzing comprises using a machine learning engine and a statistics engine to generate additional information that differs from the original and found information;

wherein the additional information provides connections between elements of the original information;

filtering using some of the generated additional information and using keywords related to the original information.

In yet another aspect of the disclosure there is provided a computer implemented messaging and management system for organizing and extracting information sent between users, and for automatically generating and updating management data based on information extracted from messages, comprising:

a. a plurality of storage devices;

b. a network interface in signal communication with the plurality of storage devices, configured to receive and store a plurality of posts, and post relational data, wherein a post is a message that comprises at least one of text, speech, graphics, and video, or any combination thereof wherein post relational data relates information associating posts with other posts;

c. one or more processors configured to access the plurality of the posts and post relational data and configured to generate a set of P-tags from the received posts and post relational data, wherein a P-tag is a tag associated with one or more posts or a post and a user, and wherein the set of P-tags have associated therewith a plurality of tagging themes, wherein a tagging theme is logical grouping of tags, wherein each P-tag has a value associated therewith, wherein some of the values are derived from users' input and wherein some of the values are generated by a tag management engine and a statistics engine;

d. a logic engine having logic gates for grouping the P-tags with associated values or P-tags with associated values and keywords into a plurality of logic expressions; and, e. a compilation engine for creating and displaying one or more management views in dependence upon at least some of the plurality of logic expressions.

In another aspect the system is further configured to receive and store data related to users, user-post linking data and user relational data and wherein the one or more processors is configured to access the data related to users, user-post linking data and user relational data and is configured to generate a set of U-tags from the received data related to users, user-post linking data and user relational data; wherein user relational data associates users with other users and user post linking data associates users with posts; wherein each U-tag has a value associated therewith, wherein some of the values are derived from users' input and where some of the values are generated by the tag management engine and the statistics engine, wherein the logic engine having logic gates is for grouping the U-tags with associated values into a plurality of logic expressions; and, wherein the compilation engine is for creating and displaying one or more advanced management views in dependence upon at least some of the plurality of logic expressions.

In yet another aspect of the disclosure a computer implemented method for organizing and extracting information sent between users, and for automatically generating and updating management data based on information extracted from messages is provided, comprising:

receiving on a network interface in signal communication with the plurality of storage devices a plurality of posts, and post relational data, wherein a post is a message that comprises at least one of text, speech, graphics, and video, or any combination thereof wherein post relational data relates information associating posts with other posts;

one or more processors configured to access the plurality of the posts and post relational generating a set of P-tags from the received posts and post relational data, wherein a P-tag is a tag associated with one or more posts or a post and a user, and wherein the set of P-tags have associated therewith a plurality of tagging themes, wherein a tagging theme is logical grouping of tags, wherein each P-tag has a value associated therewith, wherein some of the values are derived from users' input and wherein some of the values are generated by a tag management engine and a statistics engine;

grouping the P-tags with associated values or P-tags with associated values and keywords into a plurality of logic expressions utilizing a logic engine having logic gates; and, creating and displaying one or more management views in dependence upon at least some of the plurality of logic expressions utilizing a compilation engine.

There is further provided receiving and storing data related to users, user-post linking data and user relational data;

accessing the data related to users, user-post linking data and user relational data and generating a set of U-tags from the received data related to users, user-post linking data and user relational data with the one or more processors, wherein user relational data associates users with other users and user post linking data associates users with posts; wherein each U-tag has a value associated therewith, wherein some of the values are derived from users' input and where some of the values are generated by the tag management engine and the statistics engine, grouping the U-tags with associated values into a plurality of logic expressions utilizing the logic engine having logic gates; and, creating and displaying one or more advanced management views in dependence upon at least some of the plurality of logic expressions utilizing the compilation engine is for.

In accordance with another aspect of the disclosure there is provided non-transitory computer readable medium comprising program instructions stored thereon for organizing and extracting information sent between users, and for automatically generating and updating management data based on information extracted from messages, and for causing a computer system having one or more processors and storage devices to:

receive and store a plurality of posts, and post relational data, wherein a post is a message that comprises at least one of text, speech, graphics, and video, or any combination thereof wherein post relational data relates information associating posts with other posts;

access the plurality of the posts and post relational data and generate a set of P-tags from the received posts and post relational data, wherein a P-tag is a tag associated with one or more posts or a post and a user, and wherein the set of P-tags have associated therewith a plurality of tagging themes, wherein a tagging theme is logical grouping of tags, wherein each P-tag has a value associated therewith, wherein some of the values are derived from users' input and wherein some of the values are generated by a tag management engine and a statistics engine;

group the P-tags with associated values or P-tags with associated values and keywords into a plurality of logic expressions utilizing a logic engine having logic gates; and, create and display one or more management views in dependence upon at least some of the plurality of logic expressions utilizing a compilation engine.

The original information can be in the form of but not limited to messages or posts or user profile information, user judgement of the posts or other users. The additional information is a network of tags, described hereafter.

To address the above shortcomings in existing messaging systems, a new method and messaging collaboration system, for agile information management and precise information retrieval is disclosed. The disclosure described hereafter, extends on the existing ideas of tagging, in three non-trivial ways: 1) by increasing generality, flexibility and agility j tagging of posts; 2) by applying tags to users and user-post interactions, as an additional source of information in managing content of the on-line messaging system; and 3) by enhancing human tagging with machine learning (ML) algorithms. Once created, tags are used for triggering events, filtering, extracting and presenting information in custom collages.

In the group messaging communication setting, where the objective is to advance projects or insights in a given domain, it becomes practically important to be able to rapidly find value-add information. As the conversation information volume builds up, over time, it becomes increasingly more difficult to find value-add information, without having to revisit redundant, less relevant or outdated components. The advanced tagging disclosure, described in this application, further combined with bespoke rule-based filtering, results in a system capable of more precise retrieval of value-add information.

Research is indicating a clear trend that demand for video content is increasing and that users appreciate viewing videos on messaging platforms in social media. Furthermore, traditional email may, one day, become obsolete with an increasing move towards digital communication. The system described here transcends the traditional messaging platform from predominantly text-based communication exchange into a largely video/audio business experience, as well as encompassing email functionality in a modern way. The former is achieved by connecting the here described messaging system to one of existing multimedia data conversation engines, permitting data format of message submission and consumption to be independent. The new emailing is handled via organized direct messaging between users, with additional functionalities enabling users to—among others—control posting time, receipt time and expected response time—consequently resulting in reduced email traffic and increased productivity.

Another aspect of this disclosure involves automatically creating output reports from the extracted post elements, enabled by the advanced tagging system and rule-based filtering. Furthermore, the user can control the generated output document length and distribution of content. Typical documents may include: summary notes, agendas, feedback reports, task lists, etc.

The following definitions and abbreviations are to be used for the interpretation of the claims and the specification.

A semantic is meaning in language.

A post or a message is a recorded electronic communication or any data that has been encoded. It includes all multimedia data types, such as text, hypertext, URLs, graphics, audio, video etc.

An object is a meaningful or semantic subset of the original post.

Clutter is unwanted message content; or unwanted objects inside the posts.

Collage is a connected group of messaging objects.

Cluster is a group of similar things.

Descriptive Statistics is a summary statistic that quantitatively describes or summarizes features from a collection of information (I.e., posts or users in this context).

Stop words are commonly used words that are excluded from searches to help index and parse text faster. Some examples of stop words are: "a", "and", "but", "how", "or", "what" etc.

DETAILED DESCRIPTION

A semantic messaging collaboration (SMC) system, as shown in FIG. 1, includes one or more data sources, users of the system, a processor 10, and at least one storage device 11. The processor in FIG. 1 is configured to receive input data in the form of user posts 1, user-defined tags 2 or user request for data 3, to generate user (U) U-tags 14, post (P) P-tags 15 and Collages 16, and to store these in the data storage device 11. The Natural Language Processing (NLP) engine 6 includes a Topic Analysis Engine 4, Profile Analysis Engine 105 and Sentiment Analysis Engine 7. Topic Analysis Engine 4 can use unsupervised machine learning techniques to automatically analyze posts in a selected conversation discussion or sub-discussion, and to generate topic clusters. The proposed topics are then reviewed and updated by the user or moderator, before being passed to the topic classification phase. Topic classification uses supervised machine learning methods to label or tag posts according to the received list of topics, resulting in machine learning (ML) defined topic P-tags 15. Profile Analysis Engine 105 analyzes user's profile from available input data or online sources that contain user's personal information, including expertise, education, industry experience, current organization, position etc. Sentiment Analysis Engine 7 uses, amongst others, polarity detection to classify post sentiments as 'positive', 'negative' or 'neutral', and leverage these findings to calculate statistics that could provide valuable user feedback. The Statistics Tag Engine 5 is configured to dynamically collect a plurality of statistics about users and posts in the system and associate the descriptive statistics with the respective users and posts via statistics U-tags 14 and P-tags 15. Furthermore, statistics engine is evoked to apply statics to calculate the value of statistics type tags as a function of other tags. The Tag Management Engine 8 manages assignment and consolidation of user-defined tags 2 and generation of system-defined tags 18, 19, 21, 22. For example, Tag Management Engine 8 generates pre-defined tags to support specific user enabled applications such as project and workflow management. User submits their respective request for data 3 via a logic engine 17 where a logic expression is built and evaluated with the resulting output passed on to the compilation engine 9 to be rendered into a desired semantic output which can take form of an interactive, dynamic view or a pre-defined output data format such as a text report, collaged audio or video or other.

Figure 4:
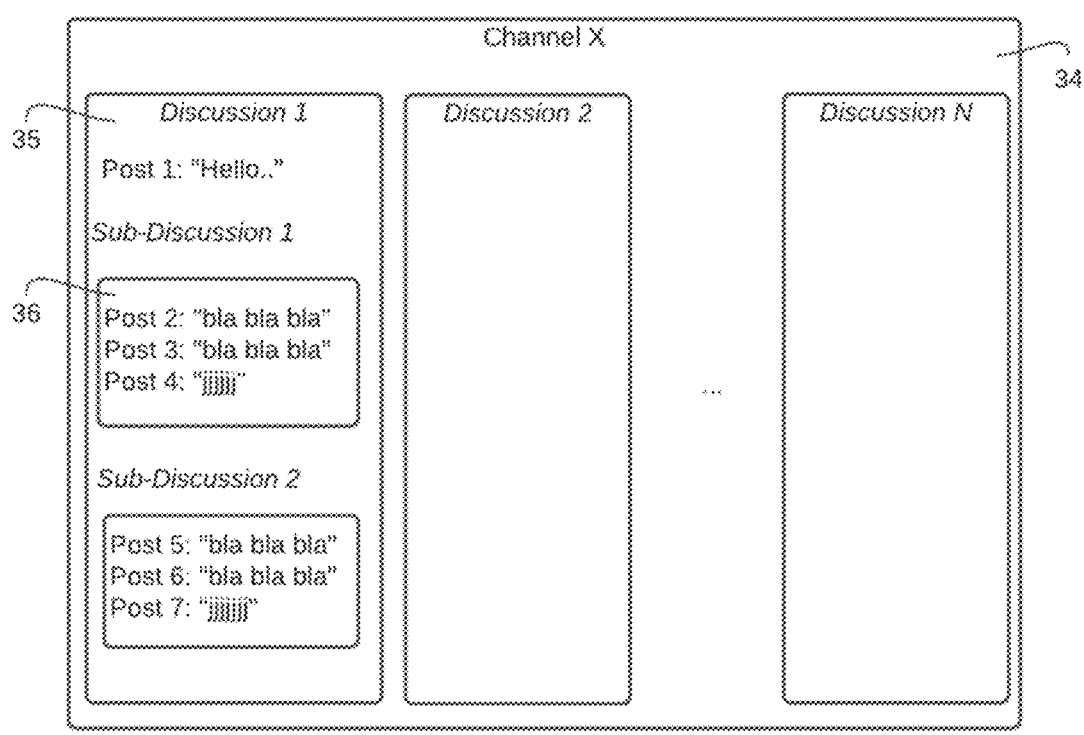
FIG. 4 is a depiction of channel, discussion and sub-discussion.

The SMC system provides an input portal for users 12 to submit their respective posts 1 in a variety of multimedia formats. For example, messages can be submitted as, but not limited to, stylized text format, hyperlinks, URLs, uploaded images, recorded audio or video. This includes users supplying the information directly into the SMC system as well as live meetings, which may be recorded and submitted real-time or subsequently. Furthermore, users can record video content with obscurity filters, which can modify the true recording to appear as, but not limited to, cartoon or pencil animation. This feature enhances communication by protecting a user's privacy and shifts the focus from one's personality to one's ideas. The system also provides various multimedia conversions, such as audio to text and vice versa. Furthermore, the SMC system permits users to control the incoming flow of messages by differing posting and/or receipt time conditional on actions or instructions. For example, conditional instruction could be to receive messages only once per day at 9 am daily, whereas a conditional action could be to receive MIMS once deadline is complete. This is an important feature in reducing messaging traffic and organizing content, whilst supporting retention of focus, and enhancing productivity. Like in other similar systems, users can select to contribute a post to an existing or new channel 34, topic discussion 35 or sub-discussion 36 as depicted in FIG. 4. Here, a discussion 35 is a group chat on a particular subject. For example, in FIG. 4 label "Discussion_1" is a name or subject or topic of the conversation that is contained within that discussion. Inside a given discussion, one can only see posts from that discussion, not the entire conversation in the channel X. Similarly, a sub-discussion 36 is nested inside a discussion 35, containing only conversation pertaining to a sub-topic of a given sub-discussion.

Figure 5:
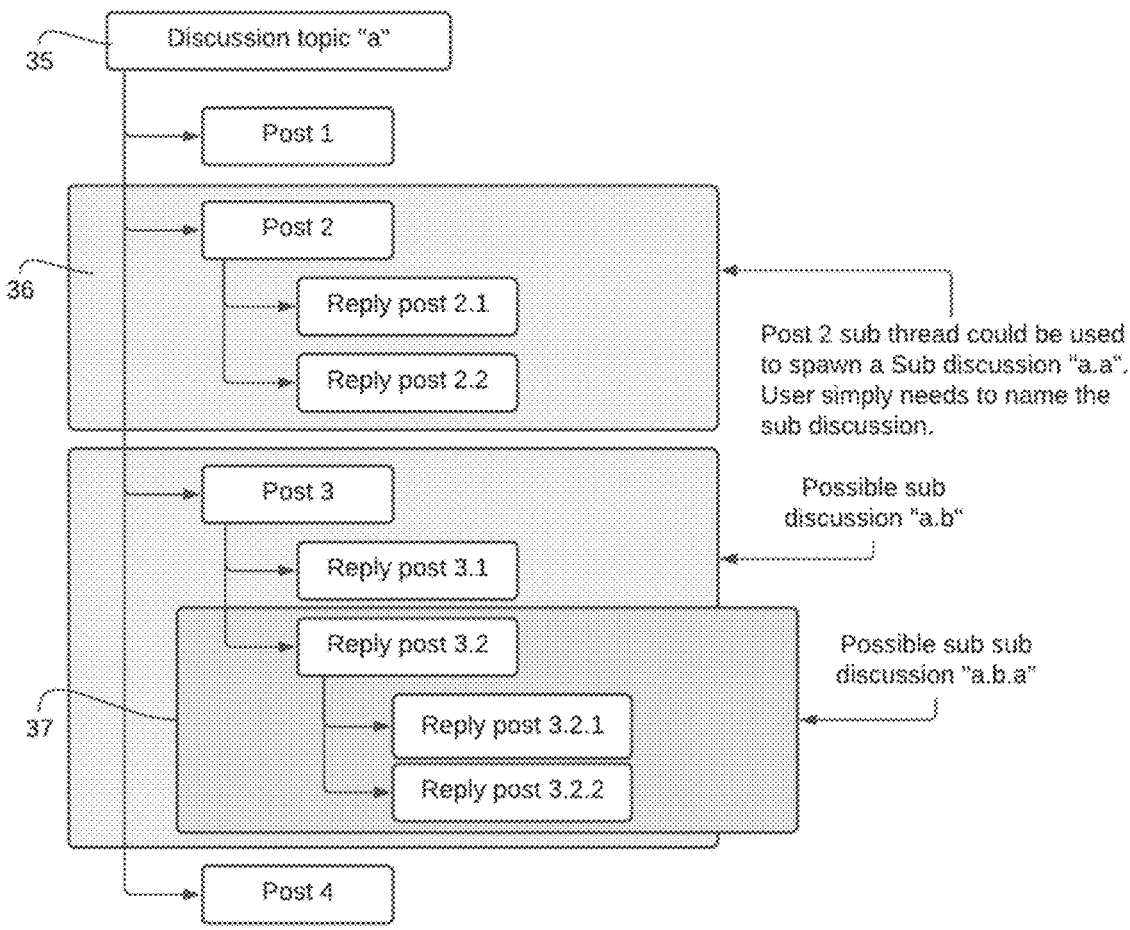
FIG. 5 is a depiction of discussion hierarchy and sub-discussion spawning.

Discussion hierarchy and sub-discussion spawning: Defining a sub-discussion 36, allows it to be listed and found at the discussion 35, channel 34 level. Similarly, defining a sub-sub-discussion allows it to be listed and found at the sub-discussion 36, discussion 35, channel 34 level. The messaging or chat interface of the SMC system is designed to encourage and entice users to respond directly to a post, whilst maintaining a parallel chronological view. For example, an existing commercial software platform Slack™ uses only a purely linear manner of posting, and Facebook™ messaging platform uses a reply to post or reply to reply manner of responding to posts. The SMC interface is designed with a plurality of display modes, including but not limited to: a) Default post/reply view as seen in FIG. 5; b) Linear display where all posts are in chronological order; c) Chat within the post/reply mode and have simultaneously another view visible displaying the posts in chronological order with links to allow navigating to sub threads or sub discussions if defined. A sub-discussion can be spawned spontaneously by the user or alternatively a discussion or sub-discussion can be organised and sorted by topic or subject of conversation, post event. In one example, a group of people could designate a channel dedicated solely to URLs, aggregated by topics of respective web content. Through the tagging system, described hereafter, the group could curate the web content for mutual use and benefit. Similarly, a channel could be dedicated to video, with channel discussions housing "in-house" videos, Youtube videos, Vimeo or other known video platforms. Furthermore, the SMC system has the capacity to automatically assign and sort posts by their type, i.e. URL, video, news update, internal blog article, MEME, meeting recap, announcement, information request etc. This feature can be used to both categorise content as well as restrict post types in the public channels or discussions.

Figure 6:
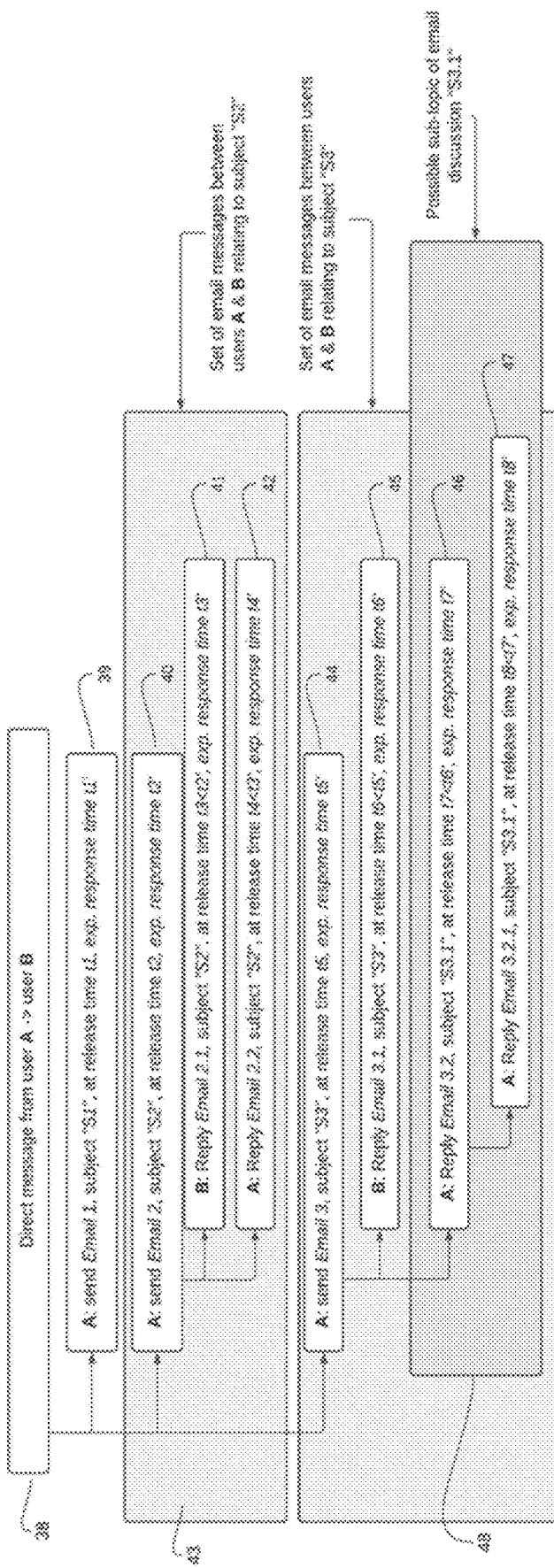
FIG. 6 is a depiction of email messaging with nested subject or topic hierarchy.

Much like other systems, users can also send direct, private messages to other users in the system. However, distinct from existing messaging systems, when using SMC direct messaging, as is illustrated in FIG. 6, the processor may time-delay post send and receipt time, based on set time or even triggers. For example, a time trigger could be setting a timer for sending or receiving a post or posts, based on relative time delay say 20 minutes from now, or specifying a time in the future, say 4.30 pm 23 Jun. 2021. Alternatively, a time delay could be triggered by an event where an event which could constitute a change of value in one of the system tags or something much broader like "when it rains next". An example of delay trigger could be dependent on the change of value in a tag, such as: send message once user A signs off on document X, i.e. Sign_off tag value changes from 1 to 0. Other action tags that could trigger the processor to send or receive a message include: Feedback_tag has changed value after receiving appropriate feedback from user B or Payment_tag value has change after receiving a payment etc. Furthermore, the user may specify the latest time when response is required or expected as well as more traditional subject of the post. FIG. 6 depicts an example conversation 38 between system users A and B, involved in a direct messaging. User A instigates a conversation with Email 1 39, stating the subject of the message as "S1". Furthermore, the system permits the user to send a time differed message. For example, if today was 9$^{th}$ February 11.26 am and user A did not want a response on the same day, he/she would select the release time of Email 1 to be close of business, i.e., 9$^{th}$ February at 5 pm. It just happens that message 39 is important and resolution is required by 20$^{th}$ February, therefore user A selects expected response time to be by 5 μm 19$^{th}$ February. This in turn enables user B to prioritize his/her work in relation to expected response time. In fact, user B could even ask the system not to display any emails that do not require attention on that day. This feature not only replaces the concept of traditional email, but further enhances it by enabling users to effectively prioritize work and slow down and reduce email traffic. Additional feature of the system is to permit nested topics 48. For example, in FIG. 6, user A commences another conversation with user B via Email 3 with subject "S3" 44, to which user B responds with Email 3.1 45. However, this time instead of replying under the same subject, user A decides that the content of the email is relating to a subset of topic "S3" and therefore responds under subject "S3.1" 46. The sub-topic allows the email to be listed and found under both subjects "S3" and "S3.1", whilst creating a logical hierarchy and organization of the messaging content.

Figure 15:
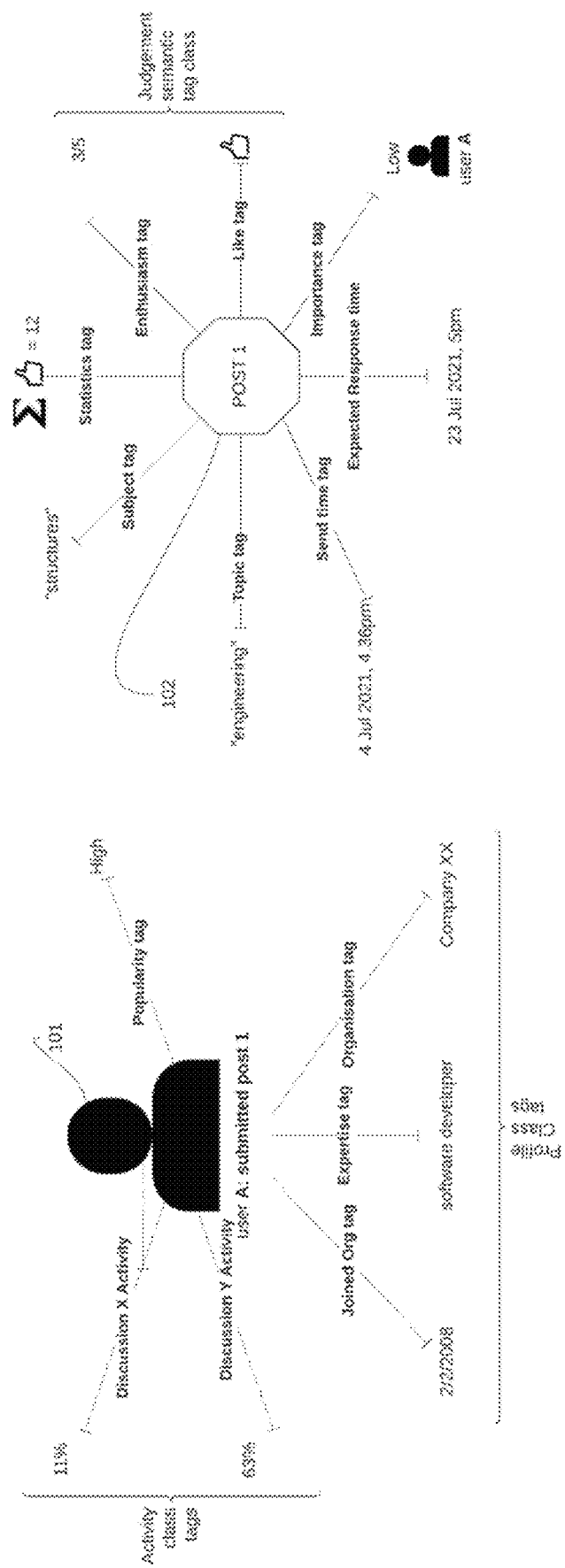
FIG. 15 illustrates a user-post neuron.
Figure 17:
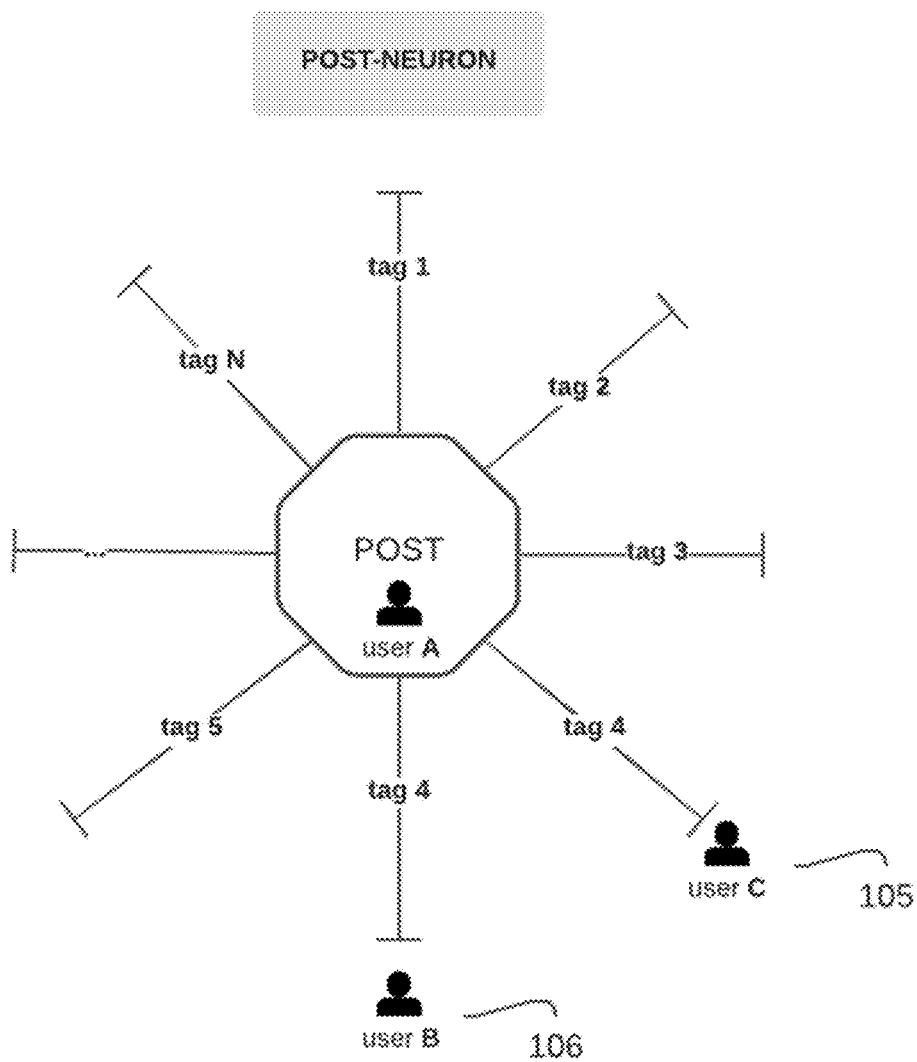
FIG. 17 illustrates an abstract post-neuron.

Tags: A new semantic tagging system is disclosed. The core concept behind a semantic tagging system is one of creating and associating a network of tags with posts 13 and users 12 to create handles on valuable information for future extraction. The tags capture user-post interactions including post relational data, user relational data and user-post linking data. The post relational data is information about how posts relate to each other and similarly the user relational data refers to how users relate to each other. The users-post linking data captures the information relating users to posts and vice versa. The above described information is stored in two types of tags: 1) tags that are associated with posts 13 and 2) tags associated with users 12. A set of tags associated or attached or assigned to posts (P) will be referred to as P-tags 15, and likewise a set of tags associated with users (U) will be referred to as U-tags 14. However, note that some tags associated with the post are also dependent on users, and vice versa some user tags are post dependent. We will refer to a post with all the attached P-tags 15 as a post-neuron 102, and likewise a user with all the U-tags attached as a user-neuron 101. An abstract example of a post-neuron is shown in FIG. 17, depicting at its core a post sent or posted by user A. The lines attached to the post represent associated tags. The tags are essentially labels or logical containers to which values are later assigned to by the users. Some of the tags will be created and assigned values by the user who posted the message or a post—i.e. user A in FIG. 17, while other tags will be created and assigned values by other users of the system—i.e. tag 4 in FIG. 17 has two values assigned to it, one by user B and another by user C. Therefore, tags represent a set of non-directional input/outputs codes for post and user-neurons 102, 101. In other words, tags provide a semantic communication layer between posts, users, posts-user, user-user and post-post interactions. The tags are logically organized into tagging themes or semantic classes 97, as shown in FIG. 15. The terms sematic classes and tagging themes are used interchangeably throughout this disclosure to refer to the same concept of a logical grouping of tags. Each tagging theme enables a new functionality in the system. Note, this logical grouping of tags may be expanded into a hierarchy of any depth, whereby each layer in the hierarchy provides meta-data about the layer below, and where the tags themselves constitute the lowest layer of meta-data. Once a user submits a request for data in the system, the neuron links are activated and the system comes to life as a network of interconnected post and user neurons, from which precise information can be extracted. The extraction process is discussed in more detail in the logic engine 17 and output generation sections.

Figure 14:
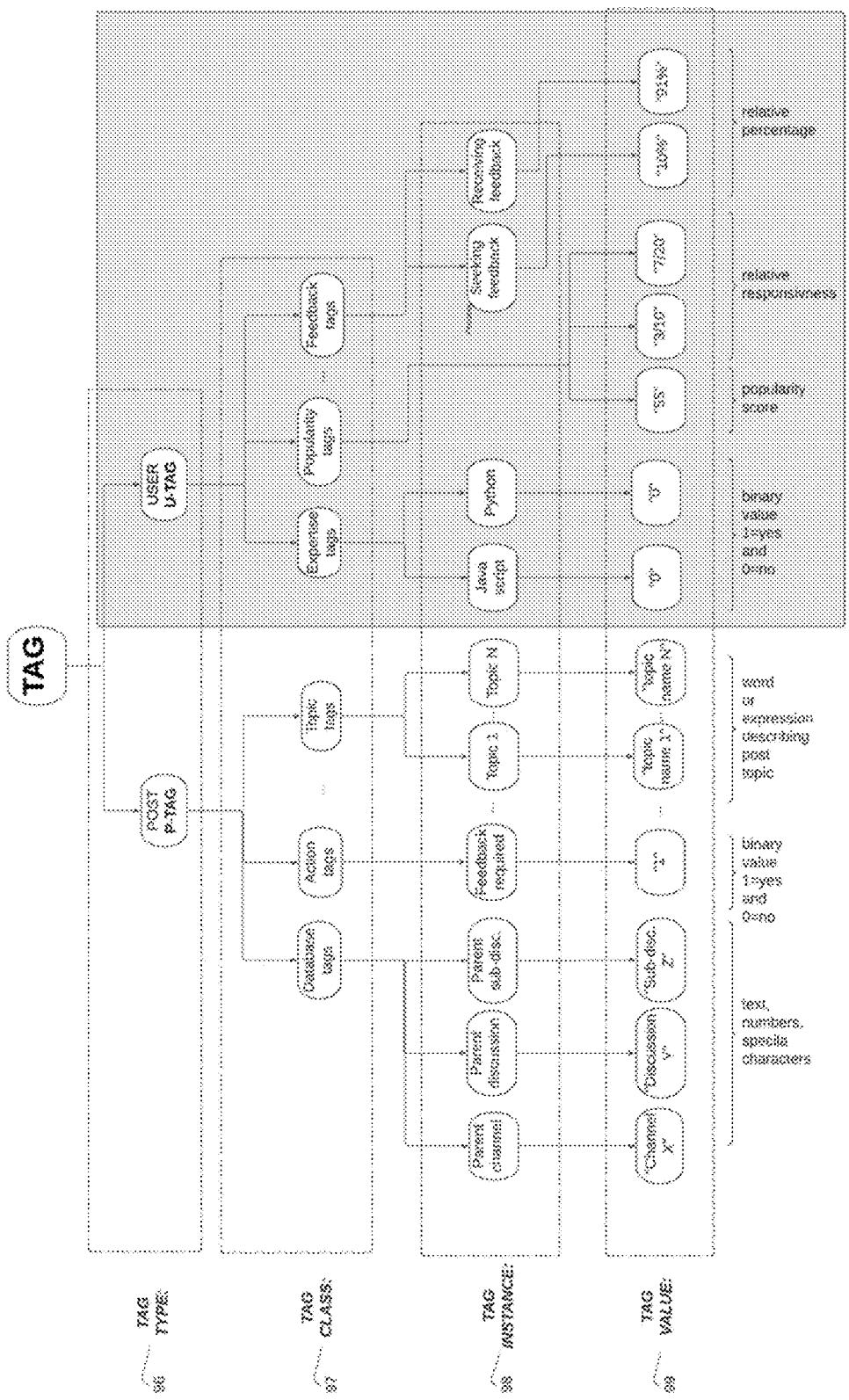
FIG. 14 shows a hierarchy of tags.

A detailed tag hierarchy is shown in FIG. 14. P-tags 15 and U-tags 14 will be referred to as tag types 96. Each tag type contains a plurality of tags that are logically grouped into semantic classes 97— we will sometimes refer to these as classes. This is essential to get the most benefit out of the system, to both reduce confusion to other users and enable more effective utilization of tags. Each sematic class, in turn, contain at least one tag instance 98 which, from here in, we will refer to simply as a tag. Each tag 98, as shown in FIG. 14, can take on a value from a set of available categorical or numerical options. For example, a tag denoting information about user's enthusiasm about a post, may take one of three categorical values: "Don't like it", "Neutral" or "Like it very much". Alternatively, the same rating could be offered as a numerical choice of integer values between 1 and 10, where 10 is the highest positive rating. The range of values a tag can assume denotes the tag resolution, and cumulatively contributes to the system's resolution. In the above example, the resolution was higher when the tag had a range of 10 numerical values, compared to three categorical values. Note, the resolution can be changed for any given tag throughout the life of the system; typically by the administrator. The system resolution dictates how precisely the information can later be extracted from the system; the higher the resolution the better the accuracy. However, the choice of desired resolution must be balanced with human capabilities to easily place judgement when presented multiple choices. Too many choices can lead to paralysis and less accurate judgement, which is counterproductive. Although the system comes pre-loaded with an initial semantic tagging system, it has the capacity to grow and evolve. This means that new semantic classes can be added, as well as new tag instances (tags) and their associated value ranges. Furthermore, all tags are dynamic, in that they can change throughout the lifetime of the system. Tag values can be either input by the users, referred to as user-defined tags 2, or generated by the semantic messaging system. More specifically, tags may be generated by natural language processing (NLP) engine 6, which we will refer to here as machine learning or ML-defined tags, by calculating various statistics in the statistics engine 5, or by extrapolating information from the stored data in the database, in the tag management engine 8, resulting in system tags. The associated tags and their portrayal in the system's user-interface may take any data format, including text, categorical, numerical, graphical and symbolic representation.

Figure 2:
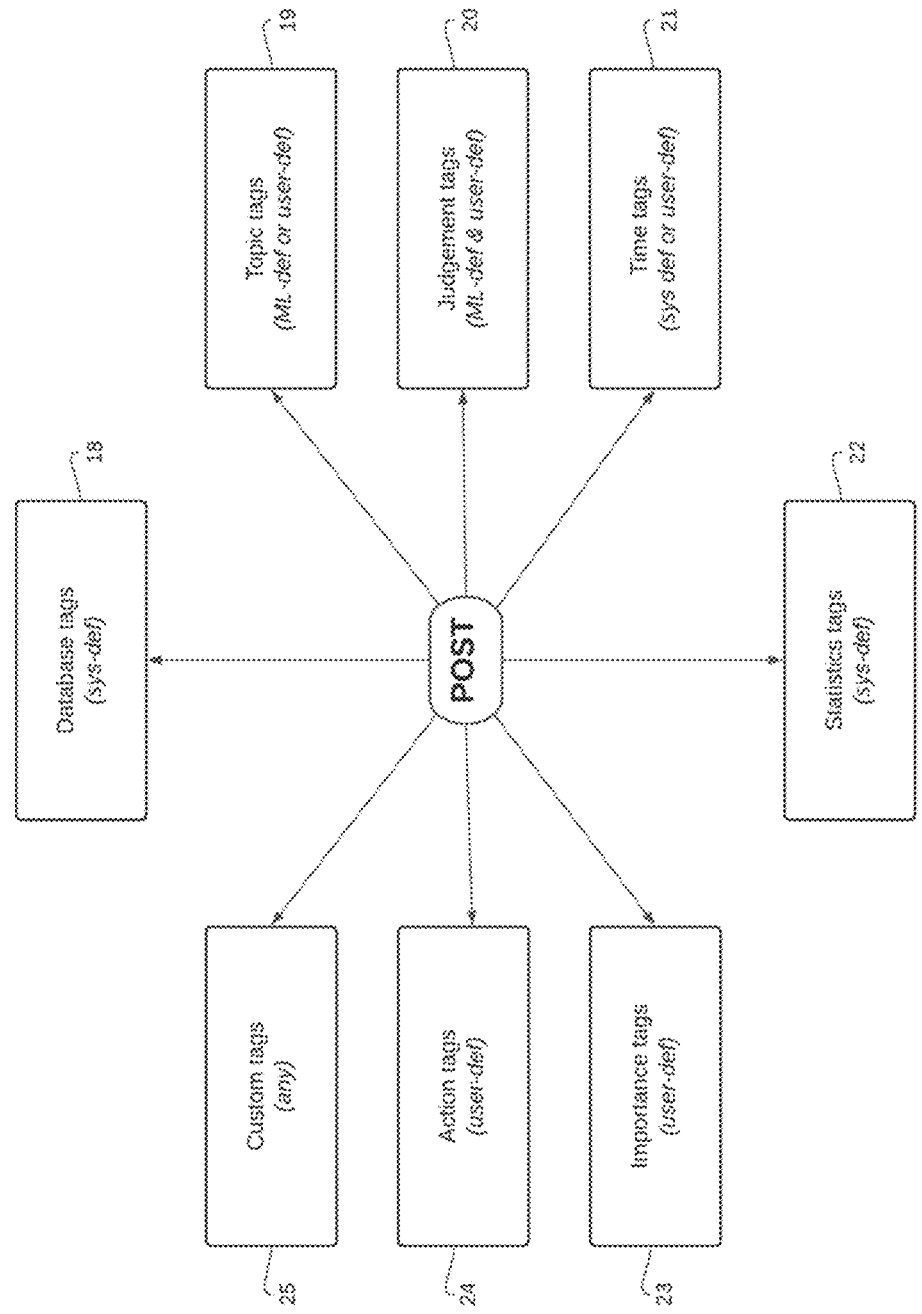
FIG. 2 is an example of some of the tags associated with a post.

In one embodiment, tags associated with a post, comprise a plurality of P-tag 15, logically grouped into semantic classes as shown in 97 of FIG. 14 and FIG. 2. Note, these are neither exhaustive or immutable, and more classes are anticipated to evolve as the users interact with the system. Moving clockwise around FIG. 2, starting at 12 o'clock, let us consider some of P-tag semantic classes in more detail. Database tags 18 comprise a set of system defined tag instances 98, extracted directly from the database. That is, any information relevant and associated with a post that is available and can be extracted from the database. For example, all parents of the post or stored message timestamps etc. In FIG. 5 sub-sub-discussion 37, post 3.2.1 has parent posts 3.2 and 3, parent sub-discussion "a.b" 36 and discussion "a" 35. Topic tags 19 can be either user-defined or generated by NLP engine 6, by analysing post content, in the topic analysis engine 4. The same topic can be assigned to a cluster of tags, informing their subject of conversation and inter-connectedness. Conversely, a single post can have many topic tags assigned to it. For example, a set of messages containing a hyperlink could be automatically tagged as URLs. Furthermore, the topic analysis engine 4 could also be employed to analyse the content pointed to by the hyperlink, thus creating sub-topic categories under the topic URL. Likewise, a set of news feeds could have a topic tag news_feed. Messages could also be manually assigned a topic tag by the user or administrator, for example meeting_recap, announcement, information request etc. Judgement tags 20 are a set of tags representing a human or machine judgement about the post. One example is a well-known "Like" button expressing a binary judgement on the post: like or neutral. In another embodiment, SMC system enables a more refined scaled judgement by using "Enthusiasm rating" signifying the degree of enthusiasm about the post. This tag could be used for decision making and reaching consensus, surveys or voting. Sentiment statistics tags are another example of judgement class tags, which can either be created by the user or generated by the NLP engine. The ML-sentiment tags can be generated by Deep Learning in the Sentiment Analysis Engine 7, which pairs many examples of natural language with labels about positivity or negativity, or even finer spectrum if required, thus developing agents that can both learn and understand sentiments underlying the messages or posts. The sentiment tags are used to generate sentiment statistics for users, providing valuable feedback. Time tags 21 are a set of tags a user can attach to their own posts, for example, in order to control message release and receipt time, specify expected latest response time, etc. The use of these tags promise improvements in reducing spontaneous messages of little value, differing emotive conversations by allowing messages to sit before impulsively sending, and more. Statistics tags 22 are a set of descriptive statistics associated with the post. One such example is tally of thumbs up, which indicates the relative group interest in the post or idea. Importance tags 23 are a set of numerical tags assigning relative importance to the post. These can be assigned by both the user posting the message as well as users consuming it. Therefore, there would be a set of user-importance pair ratings which can be used as additional source of information management. For example, if a user was away on a holiday for a couple of weeks, he/she can catch-up on missed conversations by only looking at posts rated as important by the users they trust. Action tags 24 are a set of tags with the associated timer for when an action is required. For example, a user may seek feedback by raising a Feedback flag by setting Feedback tag to say value 1 for User B, if feedback is required from this particular user. Once feedback is received the tag automatically changes to 0. This tag is especially useful for progressing and refining ideas in the context of on-line collaboration. Alternatively, other action flags could include a Signature tag indicating that certain information needs to be signed or Payment_req denoting that payment is due etc. Custom tags 25 denotes bespoke user-defined class of tags that can incorporate any custom user needs.

Figure 3:
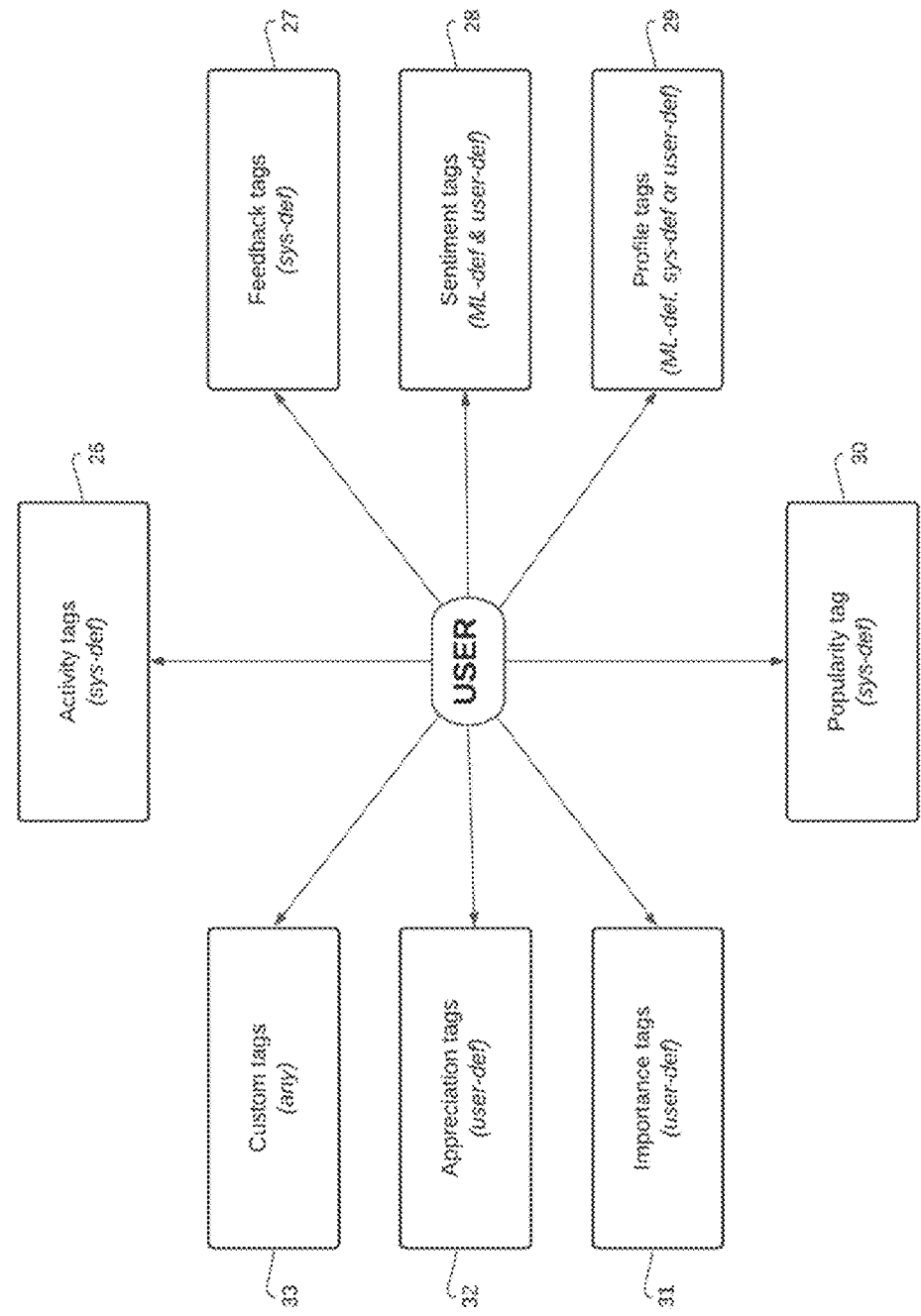
FIG. 3 is an example of some of the tags associated with a user.

In one embodiment, tags associated with a user, comprise a plurality of U-tag 14 semantic classes as shown in FIG. 3. Note, these are not exhaustive; unlimited custom tags and classes are supported by the system. Moving clockwise around FIG. 3, starting at 12 o'clock, let us consider each user tag class in more detail. Activity tags 26 are a set of tags measuring user activity statistics. For example, one tag instance in this class could measure user's activity in relation to each topic and relative to other users in that topic-group, or it could measure user's cumulative activity in all discussions. Another instance could measure, as well as graphically display—say a pie chart, of how a user is investing their energies across all discussions she/he is involved in. The possibilities are only limited by the available statistics that can be drawn from the system. Feedback tags 27 are a set of tags relating to user feedback statistics. In a way, feedback tags are a subset of the statistics-class tags 26, specifically relating to user feedback actions. For example, relative frequency of seeking feedback or providing feedback to others. Practically, these serve as one of the collaboration participations measures. Seeking feedback speaks to user willingness to expose their ideas for group feedback, whereas providing feedback is willingness to hear and contribute to other's ideas. Leveraging Natural Language Generation (NLG) and based on the feedback tags, SMC can generate a feedback report at users request. Sentiment statistics tags 28 are a set tags, these tags describe the frequency of user's cumulative "positive" or "negative" sentiment towards other's ideas. Other tags in this class include statistics around inappropriate language, or divergent exclusive posts. Sentiment statistics tag values are generated from the plurality of sentiment P-tags. These tags are a useful feedback mechanism for user reflection, growth, self-moderation and ultimately more productive collaboration. They relate to user's sense of group psychological safety, or how a user has contributed towards psychological safety of others. A recent study by Google™ has found that the common link between high performing teams is not so much who is on the team, but whether the members feel safe to share their ideas in their group. Profile tags 29 are a set of text-based tags describing a user profile. Profile tags may be added by the user about themselves or about others. For example, this may include user's current employer, group or division, position in the organisation, education or experience attributes, date joined team or discussion etc. For example, in the context of software development a person could be assigned expertise level in Java script or Web development etc. Alternatively, this information could also be automatically extracted by the SMC system, from a curriculum vitae (CV) or social media feeds using machine learning algorithms in the Topic Analysis Engine 4. The process essentially involves segmenting the respective information source based on the topic using topic classification (explained more above) and extracting data in structured form. Popularity tags 30 are a numerical statistics tag measuring cumulative records regarding popularity of interest in user contributions. One example is a cumulative tally of all thumbs up the user has received over a period of time. Many variants of this tag can be implemented in order to gain the most informative statistic. Importance tag 31 is a numerical importance rating assigned by the user to other users in their group. Preferably this is a private tag reflecting relative importance of others in the group to the user of the system. For example, in one embodiment it is related to other's positional hierarchy in the organisation (I.e. the boss) or respect or obligation assigned to an individual. Appreciation tags 32 are a set of symbolic or numerical tags representing appreciation or confidence in user contribution, relative to a topic. Unlike the Importance tag 31 which is associated with user's title or general relationship, appreciation tags 32 are topic specific and reflect a confidence level about particular user's contribution on a given subject. This tag is a useful filter when one is interested in accessing the summary of the conversation. Custom tags 33 are a set bespoke tags that users can create to support any custom needs not already covered by the existing tags.

Metatags are a type of P-tags 15 and U-tags 14, representing another abstraction layer of the tags. We will refer to all tags that are not metatags as ordinary tags or just tags. Whereas ordinary tags are an abstraction of post and/or user data, metatags highlight the properties of the tags themselves. More specifically, metatags operate on a set of tags and display summarisation or statistics of said tag values. An example of a metatag is polling. By way of example if a manager wishes to pole teams' opinion on a new policy or new software feature, he/she would write a post containing the information that requires assessment. Then he/she could set up a tag called <enthusiasm> with values {low, medium, high} and a metatag, say <vote_statistics> to tally up the votes. In this case the metatag <vote_statistics> would operate on the <enthusiasm> tag by automatically counting the values of low, medium and high enthusiasm responses. The output could be displayed on the post, with the tag icon appearing below the line, say {low: 3, medium: 5, high: 14}. Alternatively, another type of statistic could be applied to evaluate the results, mean, median, chart etc. The system comes preloaded with statistics toolbox with various charts, graphs and other typical data visualisations to choose from. For those versed in the art, implementation simply requires utilising one of the standard statistics libraries.

Natural Language Processing (NLP) engine of SMC system disclosed, comprises Topic Analysis Engine 4, Sentiment Analysis Engine 7 and Profile Analysis Engine 105. The Topic Analysis Engine 4 is used to analyze the topics of the posts to generate topic-P-tags 19, Profile Analysis Engine 105 analyzes CV's and other personal user information to generate user profile-U-tags 29, and Sentiment Analysis Engine 7, analyzes sentiment of the posts (i.e. positive or negative messaging) to generate Sentiment-U-tags 28. Finally, the logic engine 17 enables building of complex logic expression in dependence upon the generate tags and keywords, which are then evaluated and output passed on to the compilation engine 9 render and compile outputs such as dynamic text-based and/or graphics views and/or static reports, such as notes, summaries, presentations and more.

Figure 7:
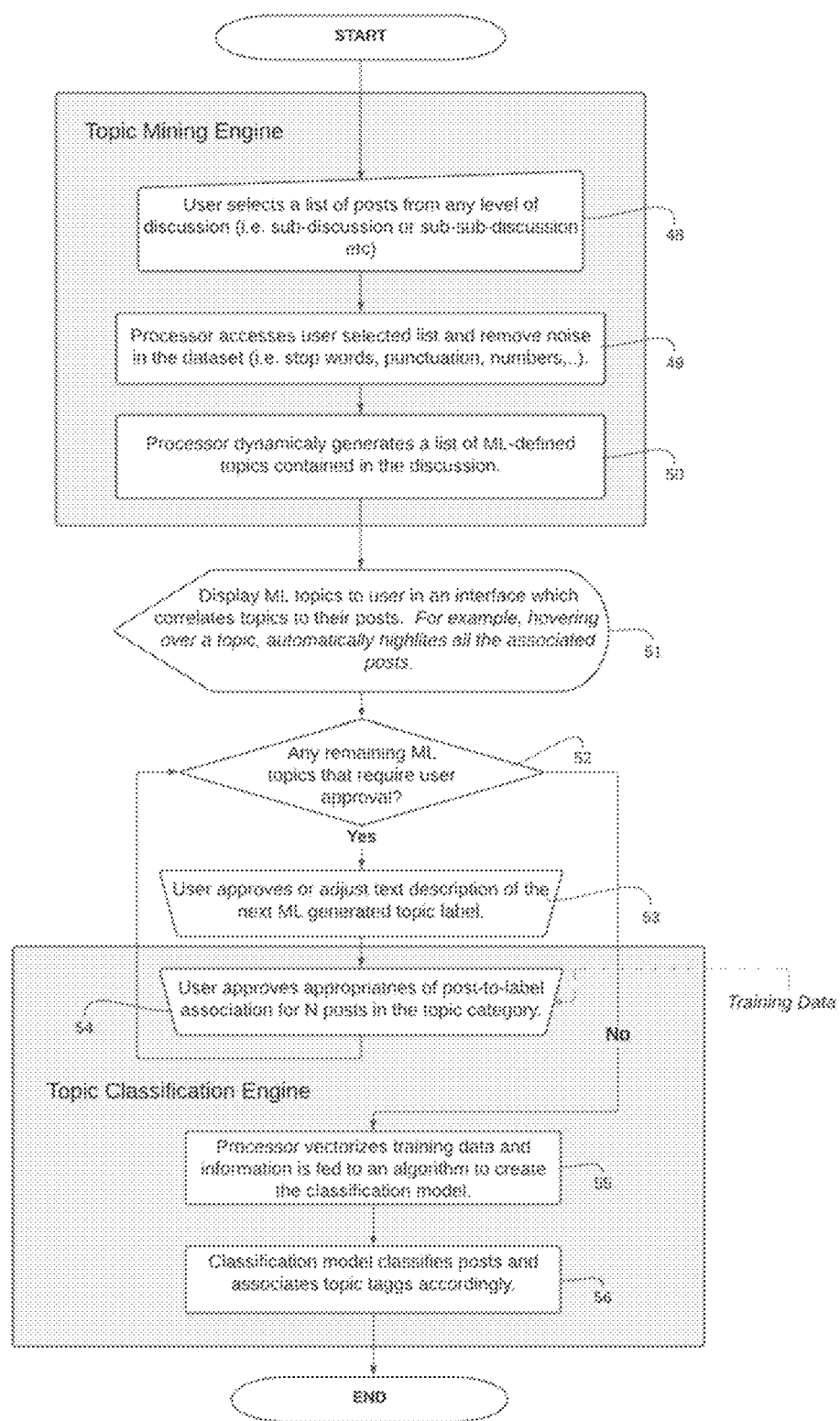
FIG. 7 is a natural language processing engine for generating ML topic tags.

Workings of Topic Analysis Engine 4 in the contexts of generating topic P-tags 19, is depicted in FIG. 7. It comprises three distinct components: 1) Topic Mining phase, 2) User review/manual input and 3) Topic Classification phase. The Topic Mining phase, as the name suggests, automatically identifies topics that are present in the selected text. It does so by clustering similar posts under topic words or expressions that it used to infer these relations. Being an unsupervised Machine Learning (ML) technique, means that it does not require manual input from the human. However, these algorithms need large volumes of high-quality data to gain satisfactory performance. For this reason, we would not apply topic modelling to individual posts, but rather collections of posts. The procedure begins with a user selecting a list of posts from any level of discussion, including but not limited to sub-discussion or sub-sub-discussion 48. The Topic mining of NLP engine 7, in processor 6, assesses the user selection and removes noise in the data 49. This pre-processing phase removes any unnecessary information such as punctuation, stop words (and, or, the, a, what, etc.), numbers, and other data that could be considered clutter in the context of topic mining. Next, the topic analysis engine 4 applies use one of the existing techniques or their variants to generate a list of topics 50, including: Latent Semantic Analysis (LSA), Latent Dirichlet Allocation (LDA), Non-Negative Matrix Factorization (NMF), Parallel Latent Dirichlet Allocation (PLDA), Pachinko Allocation Model (PAM) etc. The underlying assumption with all of these methods is that a pre-selected collection of posts comprises a mix of topics. The processor applies one of the topic modelling methods to determine which topics are present in the user selection and how strong that presence is. For example, LSA is one of the most frequent topic modelling methods. It is based on a distributional hypothesis which states that semantics of words can be understood by considering the context where the words appear. Therefore, if two words appear in the same context then their semantics will be deemed similar. Here, the LSA would compute how frequently words appear in the individual posts, as well as the selected collection of posts. Those skilled in the art will understand how to compute the word frequencies using standard techniques like Term Frequency-Inverse Document Frequency (TF-IDF)—which is a statistical measure that evaluates how relevant a word is to a post in a collection of posts. Once TF-IDF has been computed, the next step is to create a matrix containing word counts per post, where rows represent unique words and columns each post. Singular value decomposition (SDV) is then used to reduce the number of rows, and posts are compared by taking a cosine of the angle between the vectors formed by any two columns. Similar posts will result in values close to 1, whilst dissimilar posts will have values close to 0. The LDA, on the other hand, requires us to decide in advanced how many topics will be contained in a selected text, followed by an iterative process of topic assignment for each word in each post being analyzed. This is a popular topic modelling technique, with a solid performance in application containing less than 10,000 topics—which is almost always the case in a typical on-line discussion or sub-discussion.

As a result, a user will be presented with a list of topic words 50 or expressions that the engine has associated with the pre-selected list of posts. It is anticipated that this would be relatively small and manageable list. If using an LDA model the user would in advance, select a number of topics they would like to segment the text into. These are intuitively displayed in the system's user interface, where hovering over a presented topic, automatically highlights all the associated posts. A user or moderator of the discussion is then asked to iteratively scroll through this list and approve or correct the topic names/labels in order to more accurately reflect human understanding of the associated text-based content 53. Note, the topic mining phase if optional. It is quite feasible to completely skip this phase and begin the topic classification by moderator providing a topic list based on domain expertise.

Topic Classification takes as input a pre-defined list of topics, resulting from 53. In step 54 the user starts training the classification algorithm by approving or modifying the appropriateness of the topic labels with respect to the associated post cluster, generated in the topic mining phase. This process requires user to simply tick for approval, each topic-post match where the topic label provides sufficiently descriptive information about the content of the post. Once enough approved matches are completed by the moderator, the algorithm starts tagging the remaining posts automatically. Note, if topic mining phase was skipped then the moderator needs to manually associate and assign sufficient number of tags to the posts, for the classification algorithm to succeed. In step 55, topic classification engine transforms text information into vectors, using techniques such as bag of words vectorization. Recently, deep learning has been transforming text vectorization, by finding better ways to represent text. Once the text is transformed into vectors, irrespective of the text vectorization technique used in the prior step, this information is fed to the algorithm, along with the trained data set, to create a classification model. The classification model 56 can then classify new posts, because it has learned how to make predictions automatically. The more training data is provided, the more accurate the classification. Some of the widely used algorithms for topic classification include: Naïve Bayes (NB), Support Vector Machines (SVM), Deep Learning, Hybrid Systems etc. Naïve Bayes is a family of simple probabilistic classifiers, based on applying Bayes theorem, and is suitable for small amounts of data, say 1,000 to 10,000 posts. SVM is slightly more complex, but often delivers better results than NB for topic classification. Deep Learning algorithms require much more training data than the former two methods, where the number of trainings samples jumps from 1,000s to millions.

The system disclosed here adapts classification models to evolve with the data volume and maturity of the system. With time, it is expected to improve the accuracy and precision as it is learning from humans using the system. Here, accuracy is defined as the percentage of posts that were assigned the correct topic; and precision as the percentage of posts the classifier tagged correctly out of the total number of posts it predicted for each topic.

Figure 8:
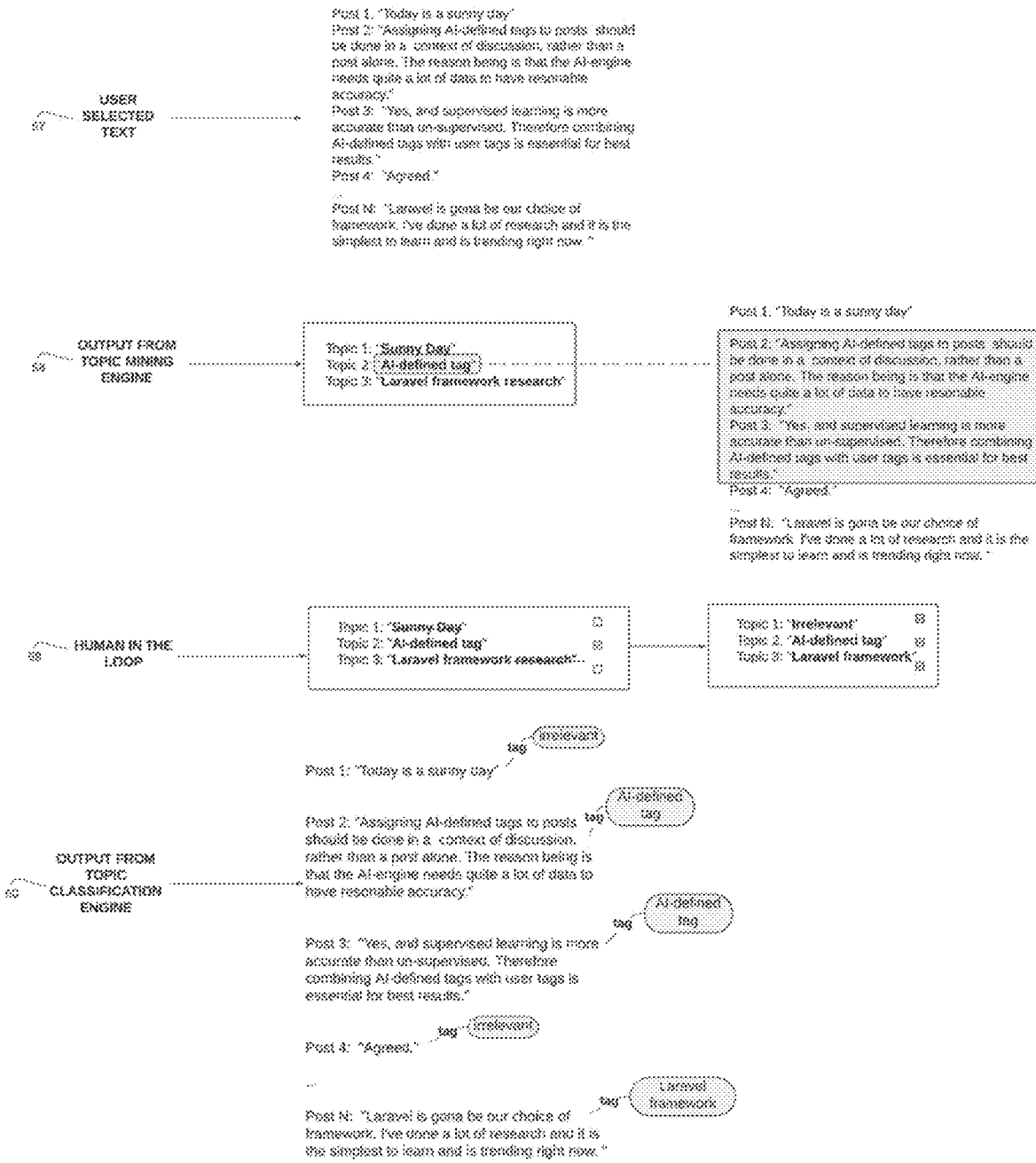
FIG. 8 is an example of NLP applied to classifying posts by topic.

Natural Language Processing (NLP) engine 6 used for topic classification of posts: FIG. 8 provides an example of NLP engine applied to classifying and tagging posts based on their topic. 57 represents a fictitious example of a user selection. It consists of a list of posts 1 to N, which could be a subset of an existing discussion or sub-discussion or sub-sub-discussion etc. This list is then received by the topic analysis engine 4, which, in this case, happens to identify three topics present in the list of N submitted posts: "Sunny Day", "AI-defined tag" and "Laravel framework research". These are presented to the user, via a graphical user interface (GUI), in 58. The human in the loop part of the process, 59, requires manual input by the user or moderator of the respective group discussion or sub-discussion. In this case the moderator reviews the three topics presented and decides to keep topic 1 but rename it from "Sunny Day" to "Irrelevant". He/she is happy with the second topic label and simply ticks a box to approve. Lastly, the user/moderator accepts the third and final topic label/tag with only minor modification where the word "research" is removed. This revised topic list is then passed to the topic classification to automatically classify any remaining posts in the original user selection. The output of this process is shown in 60, where each post now has an associated topic tag, stored as a P-tag 15 in the system.

Workings of Sentiment Analysis Engine 7: Businesses are increasingly relying on social media as their marketing platform, allowing them to reach a broad audience without intermediaries. However, there is so much information that it is difficult to quickly detect negative social mentions which could harm the business. In order to monitor emotions in social media conversations, businesses are leaning to sentiment analysis to rapidly understand their audience. Sentiment analysis is essentially an automated process for identifying and classifying subjective information in text, such as opinion, judgement or feelings about something. The most common type is the polarity detection, where sentiments are classified as 'positive', 'negative' or 'neutral'. Like Topic Analysis Engine 4, automatic sentiment analysis involves supervised machine learning classification algorithms, where unsupervised machine learning algorithms are used to explore the data—such as Linear Regression, Naïve Bayes, Support Vector Machines etc. Although humans can easily define context and polarity, the challenge is configuring the algorithm to get the same results. In order to handle context, we need to use text vectorization to map connections between words and their relations to each other as part of human speech. This is an essential foundation for proper understanding of tone and mode of message. Tools like word2vec and doc2vec can do this with ease. Algorithmia a data robot company in Seattle Wa, U.S.A provides sentiment analysis algorithms to developers, where implementation is as simple as calling REST API and requires no server setup. In particular, social sentiment analysis is an algorithm tuned to analyze the sentiment of social media—which would be directly applicable in SMC system. The algorithm takes a string and returns the sentiment rating for the 'positive', 'negative' and 'neutral', as well as the overall sentiment of the string. For the purpose of generating sentiment P-tags and sentiment statistics U-tags, the system would initially provide polarity analysis, however it is anticipated to include any type of sentiment analysis that would support continued human-machine learning. Although performing sentiment analysis is not new, the application of it in the context of a messaging system to upgrade human communication is novel. Humanity is learning to learn together whilst managing the risks of sharing our thoughts, ideas, disclosing feelings and sentiments, making and admitting mistakes, asking sensitive questions or challenging assumptions. Every complex project team that is stood up to address a novel, adaptive challenge is a new human system bringing together diverse sets of individuals with unique personalities and competing commitments. When using an SMC system to collaborate on such projects, sentiment P-tags and U-tags are used to generate user feedback reports, which can support individuals working in a shared context to enhance their emotional, social and cognitive competencies. Self-moderation based on such feedback would result in an improved collaboration, giving everyone in a team or discussion a better chance to have a good hearing and enabling individuals to speak in their authentic voice more often thus enabling creativity and innovation by encouraging and including diversity in conversations.

Generating ML Profile user tags: The user U-tags from the profile semantic class can be either user defined or generated by a machine learning algorithm which scans CV's or any available personal information on the social media, noting privacy considerations. Machine learning has recently been emerging as a strategy to help employers conduct talent sourcing and recruitment. In particular, companies are training ML algorithms to automate repetitive aspects of the recruitment process, such as resume, application review and candidate scoring. Whereas such software initially requires parsing the job specification for various keywords/skills, in the SMC system the moderator would simply select desired words or attributes of interest, i.e. Java or Integer Linear Programming (ILP0 skills. The algorithm would then search the web for the user's CV, LinkedIn account or other social media trace. Once a CV or equivalent information source has been located, it would be segmented into units for processing. In one embodiment, a feature extraction would be performed in the "skills section" of the CV. The time series could then be used to rank how much the user has practically used their qualification, assuming industry experience is more valued than qualification itself. Other elements could be analyzed and information extracted, such as job hopping, grades at university, communication skills etc. Topic classification algorithms, discussed earlier, would also be applicable here.

Statistics engine 5 handles calculation of all the required statistics in the system. It is either invoked upon the creation of a metatag, by the tag management engine 8, to act as an operator on the values of ordinary tags or to automatically perform other system statistics tracking calculations. These are primarily descriptive statistics utilized for creating certain U-tags 14 and P-tags 15. Descriptive statistics summarize and organize characteristics of data, in this case data about users 12, posts 13, user relational data, post relational data and user-post linking data. Each time a user contributes a post he/she adds information to the system's live data set. The statistics engine 5 dynamically updates all the statistics in the system at regular time intervals—in one embodiment this could be daily or hourly. Some of the typical descriptive statistics can be categorized by three main types: 1) distribution statistics—which concerns the frequency of each value, 2) central tendency statistics—which look at averages of values, and 3) variability or dispersion statistics—concerning how spread out the values are. Those familiar in the art will find the required calculations both standard and relatively simple. The unique aspect here is how these statistics are applied to achieve practical benefit for the users of the system. In this disclosure, the one aspect of the system is to collect various cumulative or other statistics via metatags, as described in more detail in the tagging sections, such as a tally of thumbs-up to measure relative interest in a post 22 or popularity of a user 30. Another example is the mean or average daily/weekly activity of users in the group-discussion, or a spread of contributions across the tasks, resulting in user activity tags 26. User feedback tags 27 are also generated by the statistics engine 5 as a relative frequency statistic of seeking or providing feedback. Statistics around the frequency of inappropriate language or divergent conversation result in negative sentiment tags 28. These are only some of many statistics that may be included in the SMC system to provide a "live" birds-eye-view and summarization of the stored conversations. In the SMC system, user can tailor the viewing pane to display desired statistics as well as create new once. For example, when utilizing a voting capability through a metatag to view statistics, a chart may be displayed in a group with live updates capturing enthusiasm vote or rating on a particular topic/idea/proposal. The statistics engine is linked to a chart library which is rendered in the compilation engine 9 to provide a graphical display of the collected statistics.

Tag management engine 8 is responsible for assignment of user defined tags 64, generation of system defined tags and management, collation and deconfliction of all tags in the system. The system tags generated by the tag management engine 8 can include all or some of the following tags: statistics metatags tags 62, ML-defined tags 63, stored parents of the post, message timestamps 18, time-tags 21 capturing a set of date and time, profile tags 29 describing user's current employer, group or division, position in the organisation, expertise, date joined team or discussion and sets of pre-defines tags, typically grouped into tagging themes to support specific applications, such as project or workflow management or polling and surveys or accounting of finance etc. With regards to profile tags, a user can opt to replace the manual input and defer responsibility to the Profile Analysis Engine 105 to automatically extract this information from user's CV or social media presence. In general, this disclosure presents a fully flexible system that permits users to utilise the full suite or a subset of functionalities as their needs and preference dictate. With regard to predefined tags, whether user or system pre-defined, the tag management engine 8 allows the creation of both ordinary and metatags via a tag creation portal depicted in FIG. 23. Here, 126 shows one embodiment of how a tag creation portal can be evoked directly from the post. The tag creation engine 8 supports creation of both public and private tags, where public tags are tags visible to all team members and private tags are personal tags that are only visible to the user. Public tags also have two categories based on who can change the value of the tag: a) single user, and b) anyone in the authorised group. An example of a public tag whose value only one user can change is TAG: enthusiasm. In this case it would not make sense for the group to be able to modify someone else's enthusiasm rating. On the other hand, a TAG: task-status value could be changed by any authorised user in a team, to "completed", once the project is indeed completed.

Figure 9:
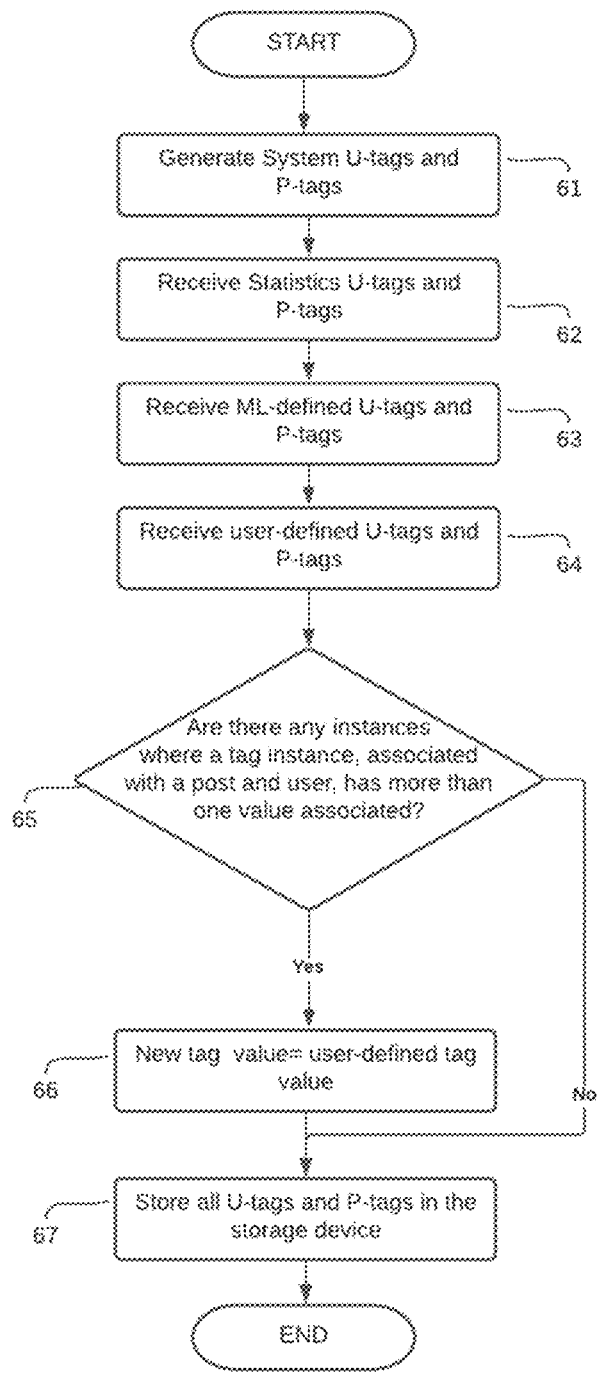
FIG. 9 illustrates how a tag management engine deconflicts tags.
Figure 23:
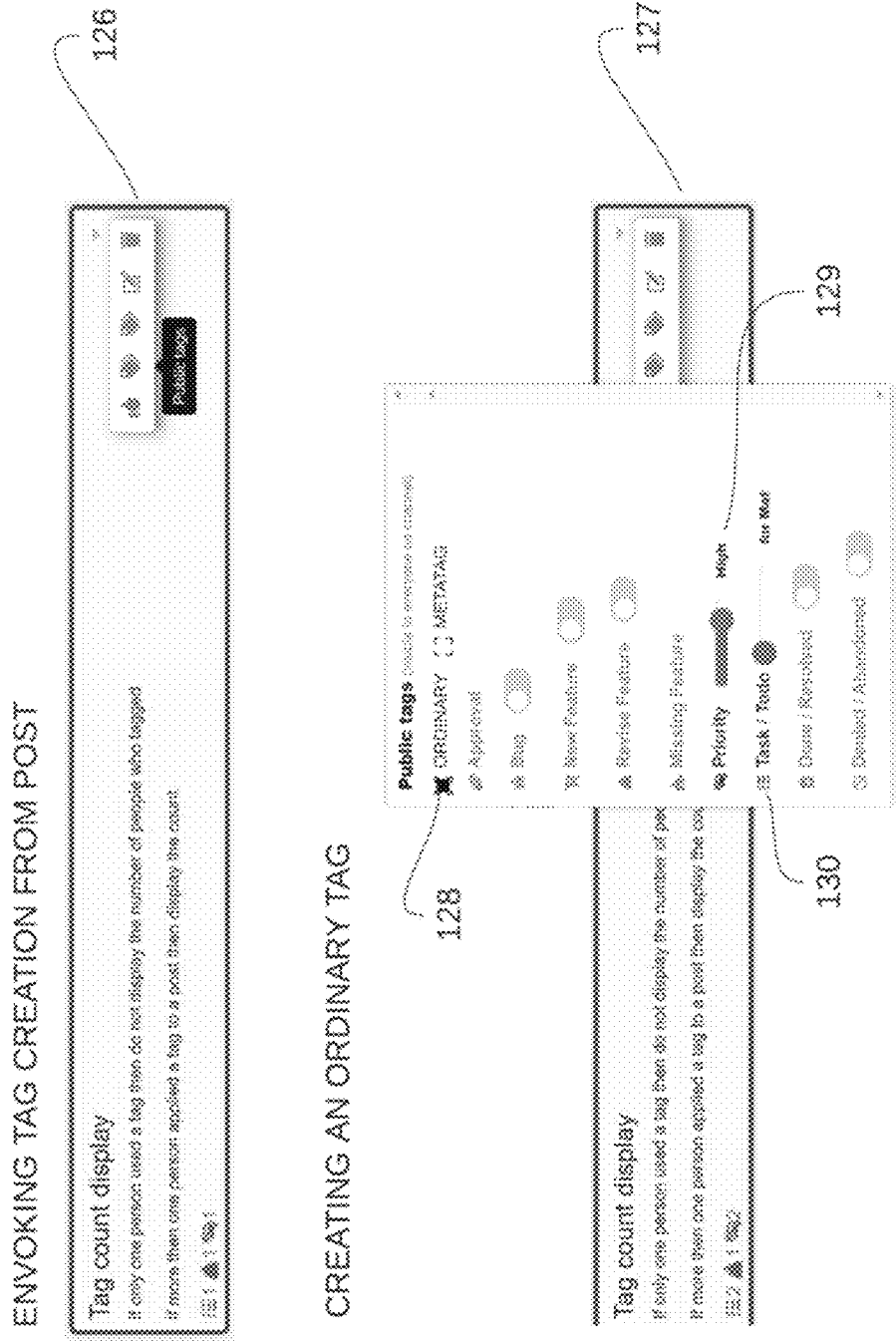
FIG. 23 illustrates how to evoke a tag creation portal from the post and how to create an ordinary tag.
Figure 24:
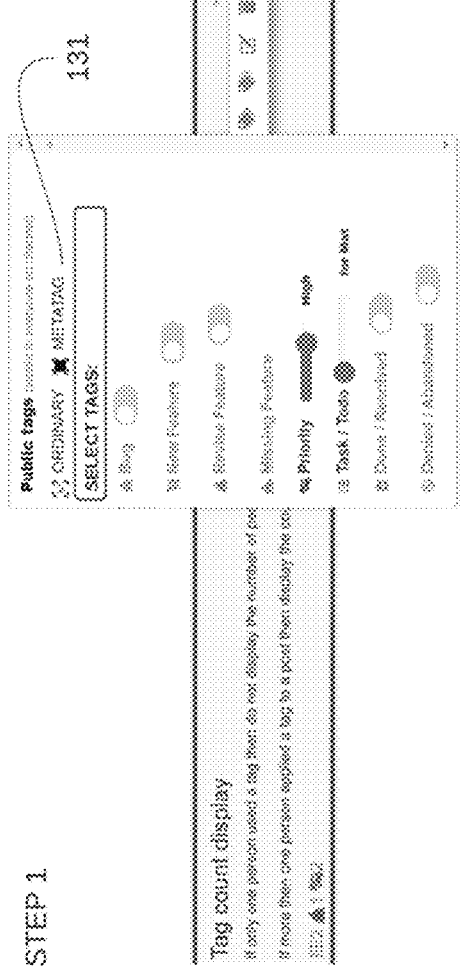
FIG. 24 illustrates how to create a metatag.
Figure 24:
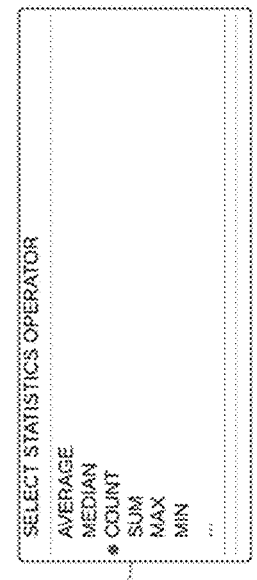
Figure 24:

Example 126 of FIG. 24 shows the process and one embodiment of the interface for the user to create a public tag. There are two distinct types of tags that can be created in the tag management engine 8, these are ordinary tags 128 and metatags. A metatag can be though of as a compound tag it can comprise multiple ordinary tags that joint by logic gates and/or statistics operators that act on the ordinary tags and/or combination of the former two. FIG. 23 illustrates the process for creating ordinary tags in 127. Here, the user Mat is attaching the following two ordinary P-tags to the shown post: TAG: priority VALUE: high and TAG: to-do with assignment value of Mat. Therefore, the post becomes part of Mat's workflow, where the given post is his personal task with high priority. FIG. 24 shows one embodiment of creating a metatag enabled by the statistics operators in the statistics engine 5 and logic expression builder from logic engine 17. The first step in creating a metatag is selecting the correct type of tag, in the example in FIG. 24 user selects a metatag. 131. He/she is then prompted to select ordinary tags on which the statistics operator will apply. In this example, the user selects the same two ordinary tags: TAG:priority and TAG:todo. In the next step the user needs to select the statistics operator to be applied, for which he/she selects COUNT as seen in 132 of FIG. 24. Finally, now that all the relevant ingredients have been selected, the user can compose the statistical expression as seen in 133. The user, in this case Mat, has selected to count the number of high priority tasks he has so he can plan his workload. Similarly, the project manager could have selected to see how many high priority tasks each person on the team has in order to evenly share the workload within the team. Another aspect of the tag management engine 8 is the collation and deconfliction process of the depicted in FIG. 9. Here we see one embodiment where if a user tag instance is assigned more than one value, the tag management engine 8 will prioritise user-defined tag value over any system or ML-defined tags values 66. If any of these tags are not available at the time of compilation, for example ML tags, then the system simple proceeds to the next step, therefore performing the collation and deconfliction of the available tags only. Once all system tags have been generated, and all conflicts have been resolved, the resulting tags are stored in the database 67.

Figure 10:
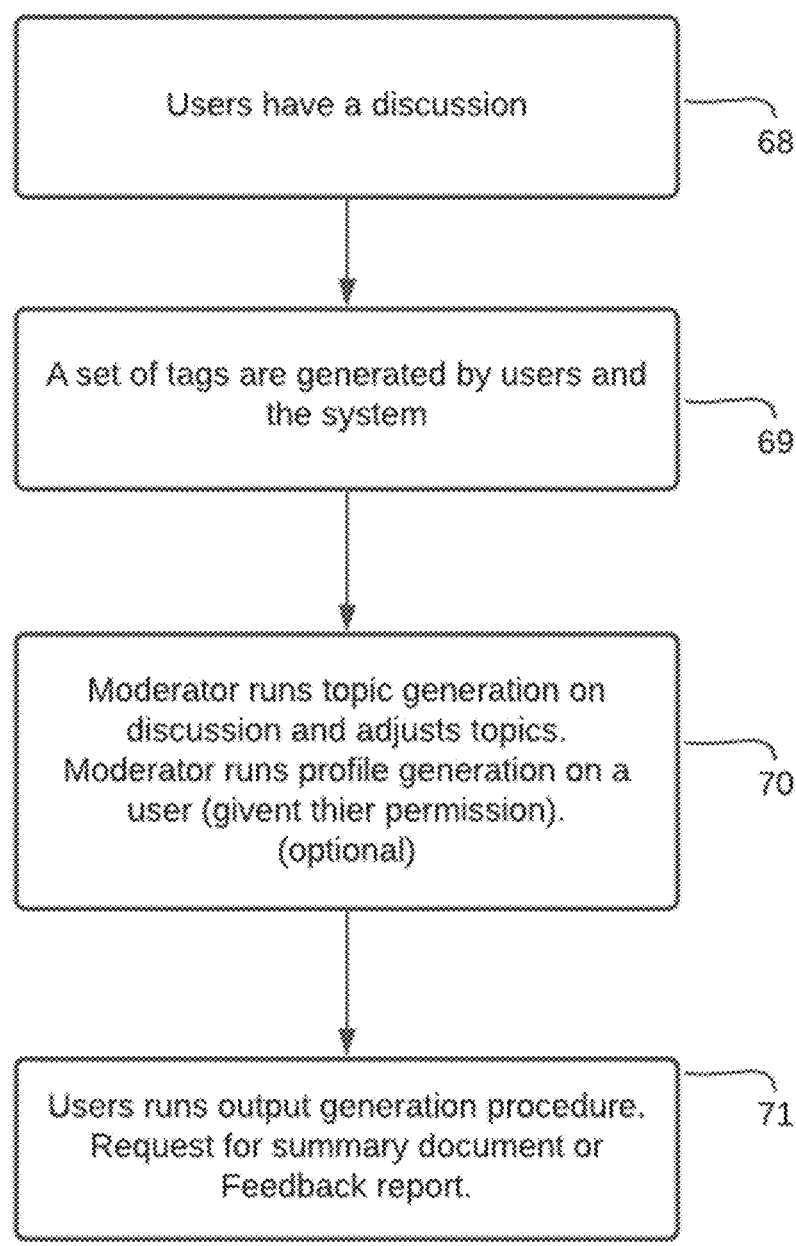
FIG. 10 illustrates high level timeline from discussion to summary output.

A timeline example from having a discussion to generating output is illustrated in FIG. 10. On a high level, the system is seeded with user discussions 68. As the posts get submitted to the system, users have an option to associate user-defined tags with any posts or users in the system 69. Concurrently, the system will generate a set of semantic messaging system tags 69 that are predominantly drawn from the database, statistics tags generated by the statistics engine 5 and sentiment tags 28 generated by the Sentiment Analysis Engine 7 in the NLP engine 6. Upon user or moderator request with user text selection, the Topic Analysis Engine 4 generates a list of post topic tags for moderator review and subsequent post classification 70. Furthermore, a moderator can choose to invoke the Profile Analysis Engine 105 to create profile tags for a specific user of interest. In one embodiment, a user would need to grant permission for moderator to search the web for the personal information. At that stage, the system is ready for a user to submit a data request, for example, for a summary or feedback report and invoke an output generating procedure 71.

Tagging themes or semantic classes represent logical groupings of strategic tags, designed and constructed in such a way as to maximize communication efficiencies and management of generated information, all tailored to specific business needs. Each tagging theme, backed up by the: statistics engine 5, logic engine 17, tag management engine 8 and compilation engine 9 (and in some case NLP engine 6) generates a new utility or application for the system. Some examples include: workflow management, project management, survey management, accounting management, finance management, programming management and more. Let's first look at an example of the programming management utility granted by the programming tagging theme. Here, a software development business/team, comprising Bob, Jane and Michael, may have the following needs: a) easily and organically assign tasks as they emerge through conversation, b) input and search for code specific text, c) pole enthusiasm on a new feature, d) report bugs, e) mark off completed tasks and f) assign approvals. In order to efficiently manage these needs, the authorized team member(s) could decide to generate a new tagging theme, say programming theme, containing the following set of individual tags respectively: a) <to_do> tag taking values {for Bob, for Jane, for Michael}, b) <code> automatic tag that recognizes code specific text, c) <enthusiasm> tag which uses statistics engine to pole the cumulative enthusiasm rating on new software features, d) <bug> tag associated with posts reporting bugs, e) <task_status> binary tag that indicates task status, and f) <approval> tag indicating managers approval of proposed bug resolution or new feature. Utilizing the programming theme, Bob could commence a work day by searching for tasks assigned to him that have not yet been completed, via a simple query: <to_do>=for Bob AND <task_status>=not complete. The resulting search may return a large number of tasks, after which he may decide whether he wants to work on new features or fix programing bugs. Say that he wanted to work on fixing bugs, he would just update the query as follows: <to_do>=for Bob AND <task_status>=not complete AND <bug>=true. Jane on the other hand may be searching for a piece of code she wrote earlier that her team members loved it, but it was quite a long while ago. Rather than scrolling through the history, she would simply write the following query: user=Jane AND <code>=true AND <enthusiasm>=love it. As the team continues to work together, they may decide they need new tags to further improve efficiencies and decide to include, say <seek_confirmation> or <time_sensitive> tags. Whatever it may be, the tags are not set in stone and the team can, at any time, revise the tags and their associated values to suit. Furthermore, new tags could be added to the programming theme and/or other obsolescent tags removed. The same team may later need to collaborate on the marketing and sales of the software product they have been developing, at which point they could introduce a new theme to support this newly emerged need, say marketing and sales theme to support marketing and sales management.

Generating and collaborating on the tags, via structured tagging themes, presents another layer of generality and control that is returned to the users and managers. Rather than rigidly prescribing tags, the system permits users to collaborate on the public tags and tagging themes, share them and evolve them over time in teams and communities. Through this evolution, one could expect to see some ingenious ways of managing the information emerge.

Figure 11:
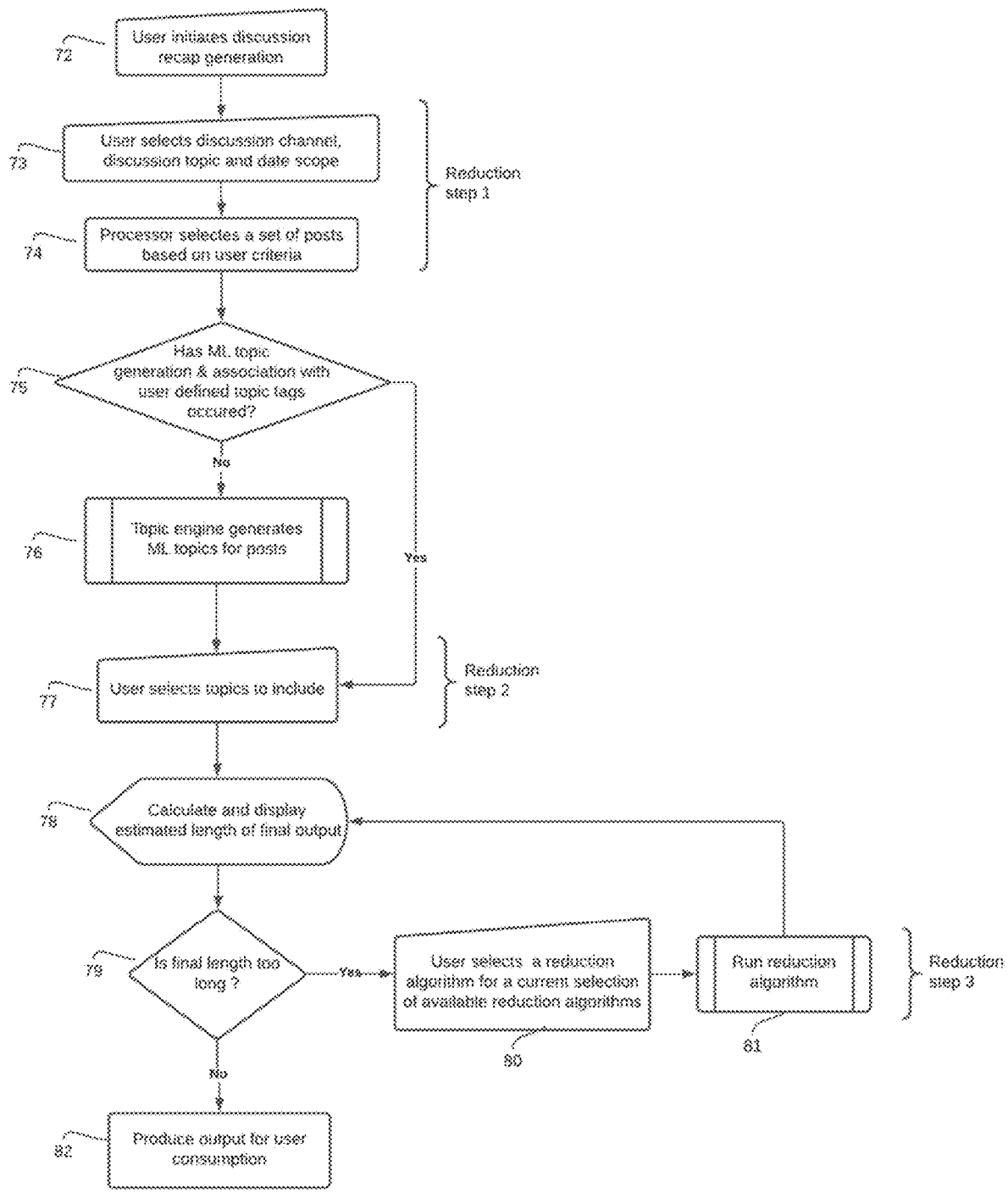
FIG. 11 is a summary or file output generation procedure.
Figure 12:
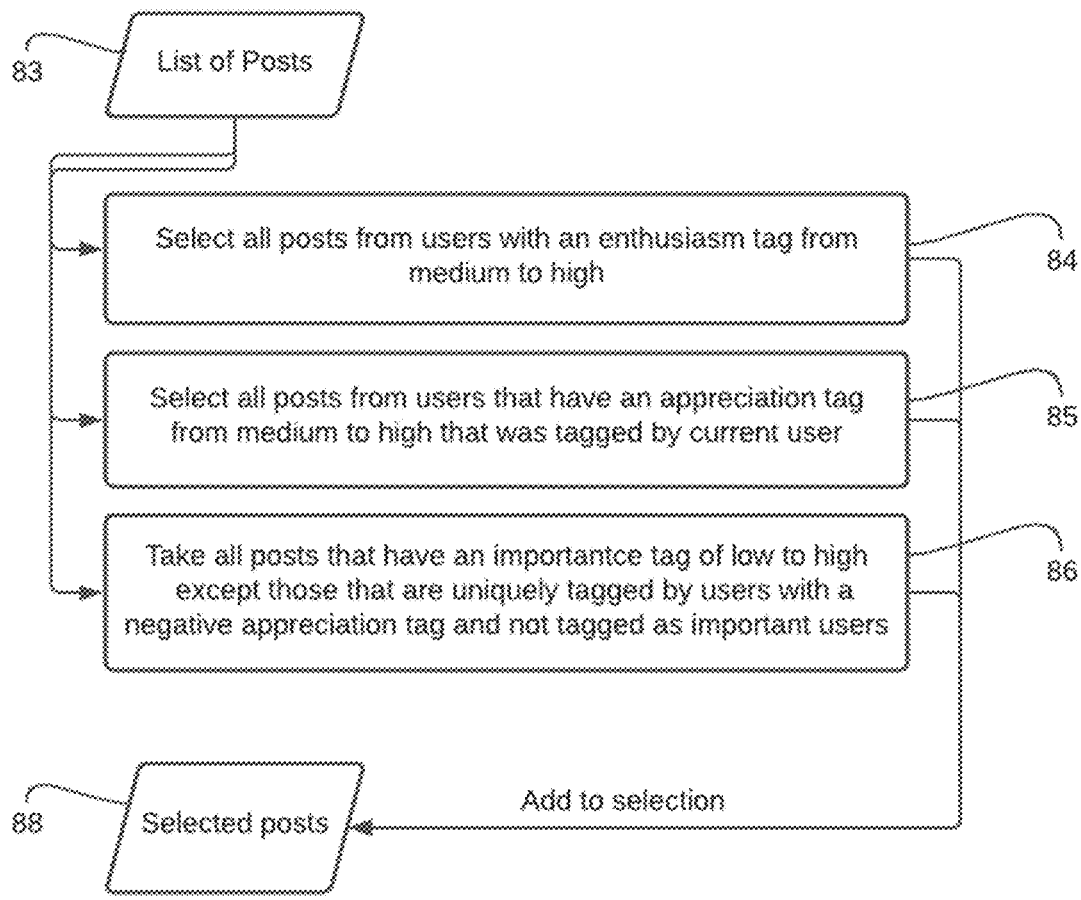
FIG. 12 is an example of Reduction 3 algorithm, from FIG. 11.

Output Generating Procedure is shown in FIG. 11. It begins with user initiating a request for a summary report or recap or meeting notes 72 or other, via the user request for data 3 through a GUI portal. The user then needs to select a channel or discussion or sub-discussion or a set of discussions or sub-discussions that he/she would like to summarize 73, along with the time frame. For example, user may request a summary report from sub-discussions X & Y, under discussion A, channel B, covering all messaging between December 2019 until January 2021. The processor would then find all the posts that fit these criteria 74. Therefore, steps 73 and 74 have now reduced the total stored posts in the system to a smaller, more manageable subset of posts. Step 75 checks if the ML-topics have been assigned to the selected collection of posts, and if not, they can be assigned in step 76 by invoking the NLP engine 6. Once ML-topic tags have been generated, the user or moderator reviews the list as described in the topic classification engine procedure of FIG. 7. At this point, user has an option to control the length of the summary report, whereby the system presents the total length of the current selection 78. If the length is deemed to be too long, the user can select one of the reduction algorithms 80. This step leverages the sophisticated tagging system for filtering and reducing the summarization content. After the reduction user reviews the updated length (presumably shorter than the last one) in step 78. If the length is satisfactory, the output is generated in 82, otherwise the reduction process repeats until requesting user is satisfied. One example of a reduction algorithm is described in FIG. 12. Here, a user is interested in seeing only posts with judgement tag 20 medium to high 84, and appreciation tag 32 from medium to high 85. A further reduction 86 could be to exclude users with negative importance tag 31 and negative appreciation tag 32. Finally, the reduced selection of posts is added in 88.

Figure 13:
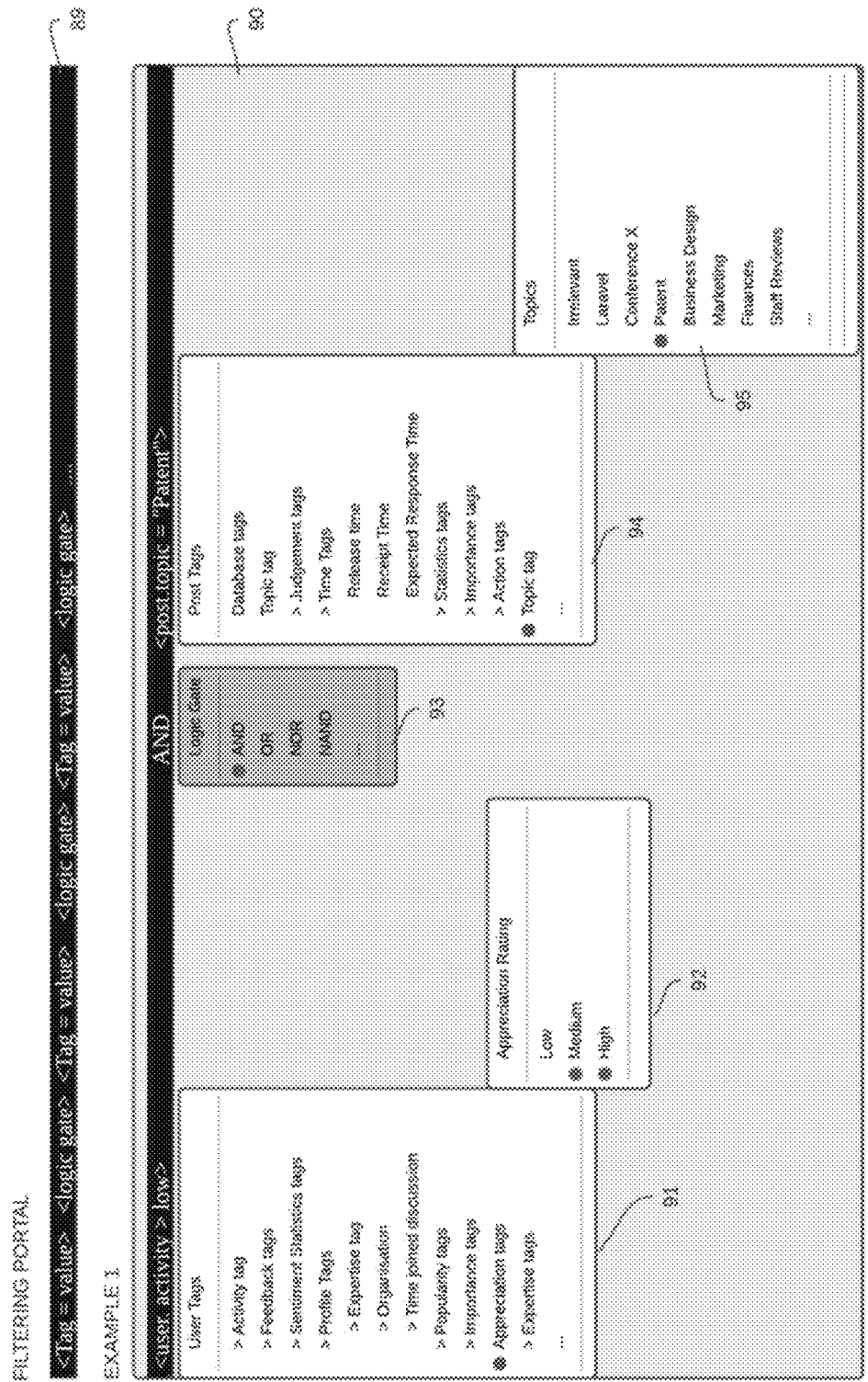
FIG. 13 is one embodiment of the logic engine.
Figure 18:
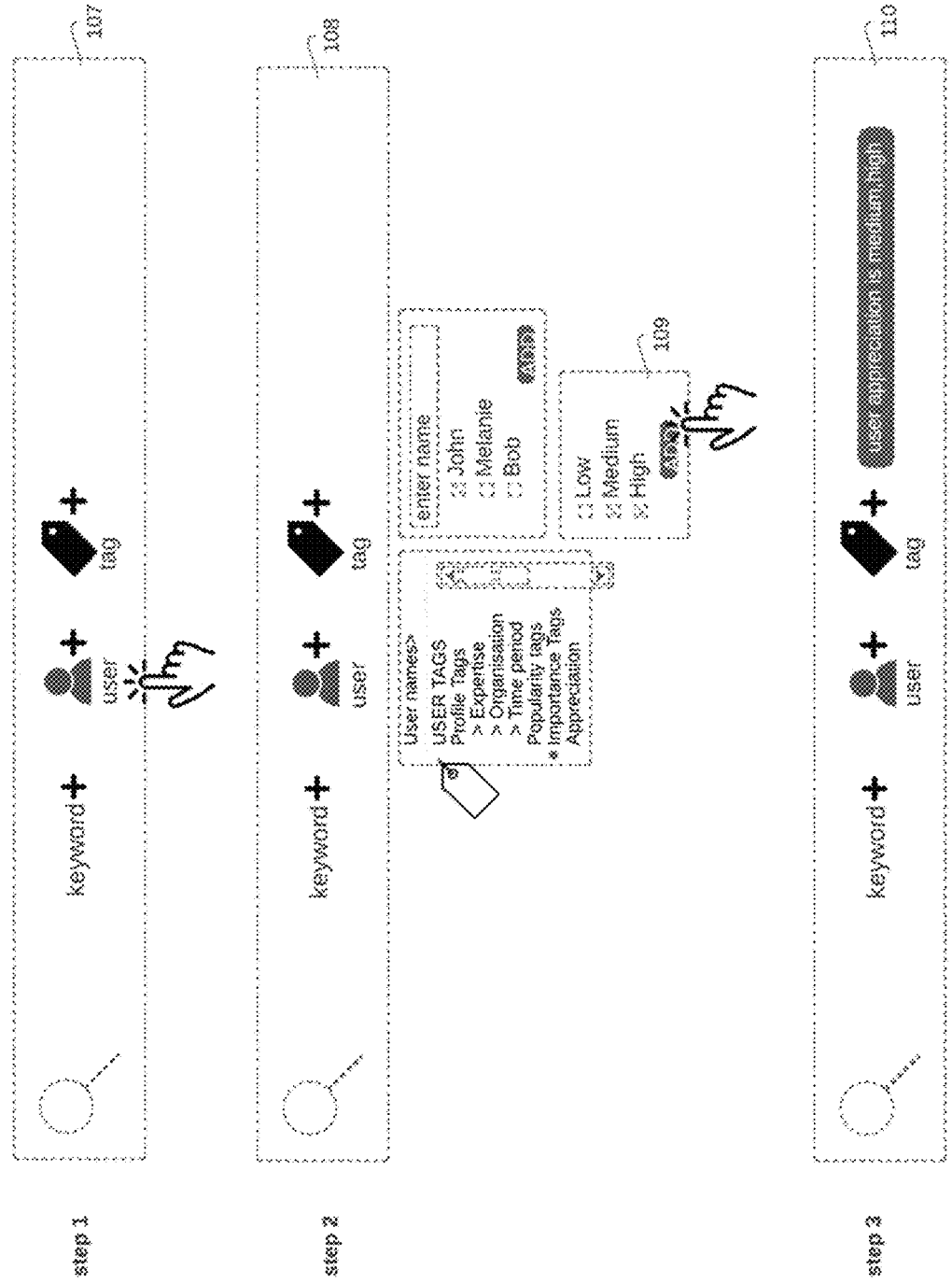
FIG. 18 is second embodiment of the logic engine.

The logic engine 17 enables creation of complex logic expressions using existing U-tags 14, P-tags 15, and the information 103 contained within the values assigned to these tags, to precisely extract desired information and render it in, a compilation engine 9, into meaningful outputs. The logic engine 17 comprises a filtering portal and logical expression builder, as depicted in FIG. 13, followed by the evaluation process executed in dependence on the said logic expression. The filtering portal enables users to submit complex queries to the system, for the purpose of finding and extracting information. It leverages three types of information: keywords, users and tags (U-tags 14 or P-tags 15) or any combination thereof. Keywords are utilized in a typical way, however in the system the search is enhanced by combining it with the new information from the tagging system, possible due to creation of the user and post neurons and their relevant interactions. A plurality of tags (including metatags) and keywords can be selected, adjoined with logic gates such as AND, OR, NOR, NAND. In another embodiment the same may be achieved with groupings of AND, OR and NOT etc. Furthermore, in queries with AND and OR statements user can attach weight to each AND statement, so long as the total percentage adds up to 100%. This way he/she can control the content distribution, such as: query X=25%<input 1> OR 17%<input 2> OR 58%<input 3>. This is useful when the available information is plentiful, and more than the amount user is prepared to digest at the time. A practical example could be a user wanting to retrieve latest news feed and entertainment from the SMC system, and is interested in 25% of the content being about "cars", 17% "Sky news" and 58% "funny videos". FIG. 13 shows two possible embodiments of the filtering portal and logic builder. Here, 90 shows a possible text-based interface and 89 a more intuitive visual builder. In the former a user could start typing a query containing the name of the tag instance and the system would assist by autocompletion, whereas in 90 a drop-down menu 91 would appear. The query command for selecting a tag could begin by user first writing the tag type: user or post, followed by a tag instance and finally assignment of desired value for each selection. In one embodiment, the syntax could be such that these qualifiers are separated by dots. For example, in FIG. 13 in case of the visual expression builder 90, the user wanted to perform a search by filtering the posts based on user appreciation tag 32 being medium to high 92 and post topic tag 19 value "Patent" 94, 95. Alternatively, in the text based search filter he/she could write <user.appreciation>low>& <post.topic="patent"> or <user.appreciation>low>AND <post.topic="patent">. This type of text-based interface is particularly well suited to those that are familiar with code and prefer the more efficient but also more technical interface. Another, less technical embodiment of the logic engine 17 interface is presented in FIG. 18. Here, a user is greeted with a search bar containing three icons enabling interaction with keywords, users and posts, as can be seen in 107. Should a user decide to click on icon user+, a popup menu would appear permitting either a selection of one of the other users or user tags 108. In the example shown in 108 available users are John, Melanie or Bob. However, our user is interested in filtering based on user tag values irrespective of the user. He/she is interested in seeing posts from their bosses and hence chooses an importance tag 31 containing ranking of medium to high 109. Once checking his/her selection the user clicks the ADD button 109 to add this selection to the query. The selection is now observable in the portal, as seen in 110. From here the process repeats, with user being able to select a plurality of different choices combined with logic gates. The purpose of the logic gates is to permit searches beyond just AND or intersections, by allowing users to gather a union or complement of the interacting search components. Finally, a graphical drag and drop implementation of the logic builder represents yet another embodiment where user could interact with four graphical components: 1) a tag condition, 2) a logic group AND or OR, 3) a NOT container and a 4) statistics operator. These types of logic elements or components could simply be moved (i.e. drag and dropped) and placed within another logic group or NOT group or statistics operator. 1) A tag condition could be graphically represented by a blue pill (rectangular box with rounded corners) with a descriptive text in the middle. Its web based implementation could be a group of HTML (Hyper Text Markup Language) elements styled with CSS (Cascading Style Sheets). This would represent a single tag with its value, where the values of the tag are stored in data attributes directly on the HTML components. 2) A logic group could also be graphically represented by a colored pill, where the color changes according to its imbrication level (groups nested within groups). Here, all relevant data that is not to be visually displayed would be stored in HTML "DATA" attributes directly on the main HTML container. This element could contain any number of other logical elements within it. You could consider it a container of sorts. The logic group can either be a logical "AND" group or an "OR" group, but not both. What this means is that each child logic element within the parent logic group will all be separated by either "AND" logical conditions or "OR" logical conditions. Akin to mathematical logic, the group is equivalent to encapsulating a set of sub logical conditions within parentheses. Some examples include: (condition 1 AND condition 2 AND condition 3) or (condition 1 OR condition 2 OR condition 3) or Nested groups: (condition 1 AND (condition 2 OR condition 3)). 3) a NOT container is used to represent the "NOT" logical condition, meaning the absence of a condition as opposed to the presence of a condition and could be visually represented by a black pill. It can only contain one logical condition within it. The one logical component it contains can be a logic group that itself contains multiple conditions. Examples include: (NOT condition 1) or (NOT (condition 1 OR condition 2)) or (NOT (condition 1 AND condition 2)). 4) statistics operators are described in statistics engine 5 section. These include examples such as: average( ), min( ), max( ), variance( ), count( ), sum( ), etc. Note, when more then one child logic element is present with a logic group, the elements would be separated by one type of logical separators, either "AND"s or "OR" s.

These separators are represented graphically and are functional HTML "SELECT" combo boxes that can be used to change between the two types. Changing one separator within a group will update all other separators within the group to the same value.

Its not mandatory to group up logical conditions within other logical groups. The logical elements that are present at the root level (not contained in a logic group) will be handled in the same manner as if they were all grouped in an "OR" logic group. The visual representation would be converted to its programming language equivalent.

Figure 16:
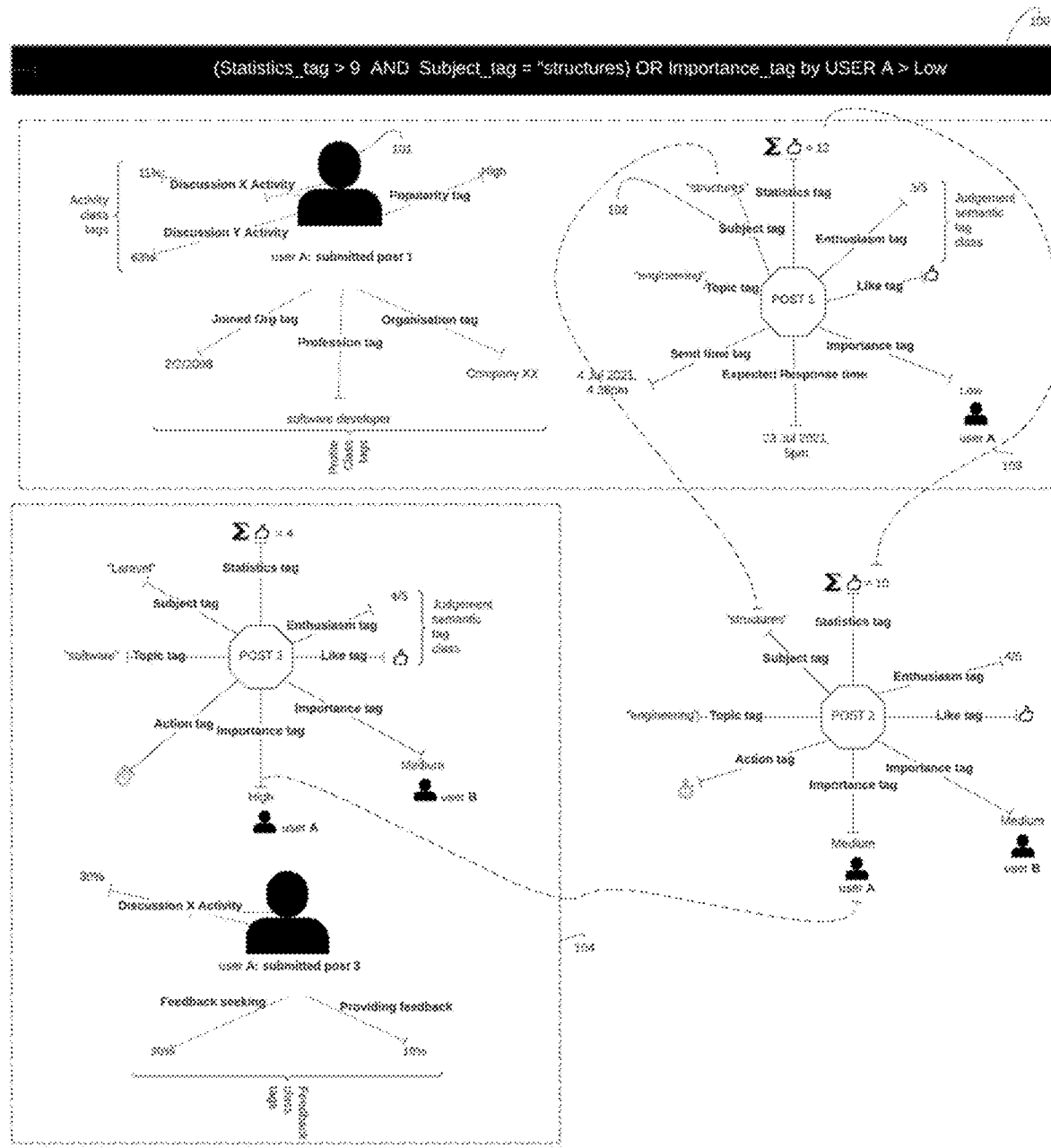
FIG. 16 illustrates interactions between user and post-neurons.
Figure 19:
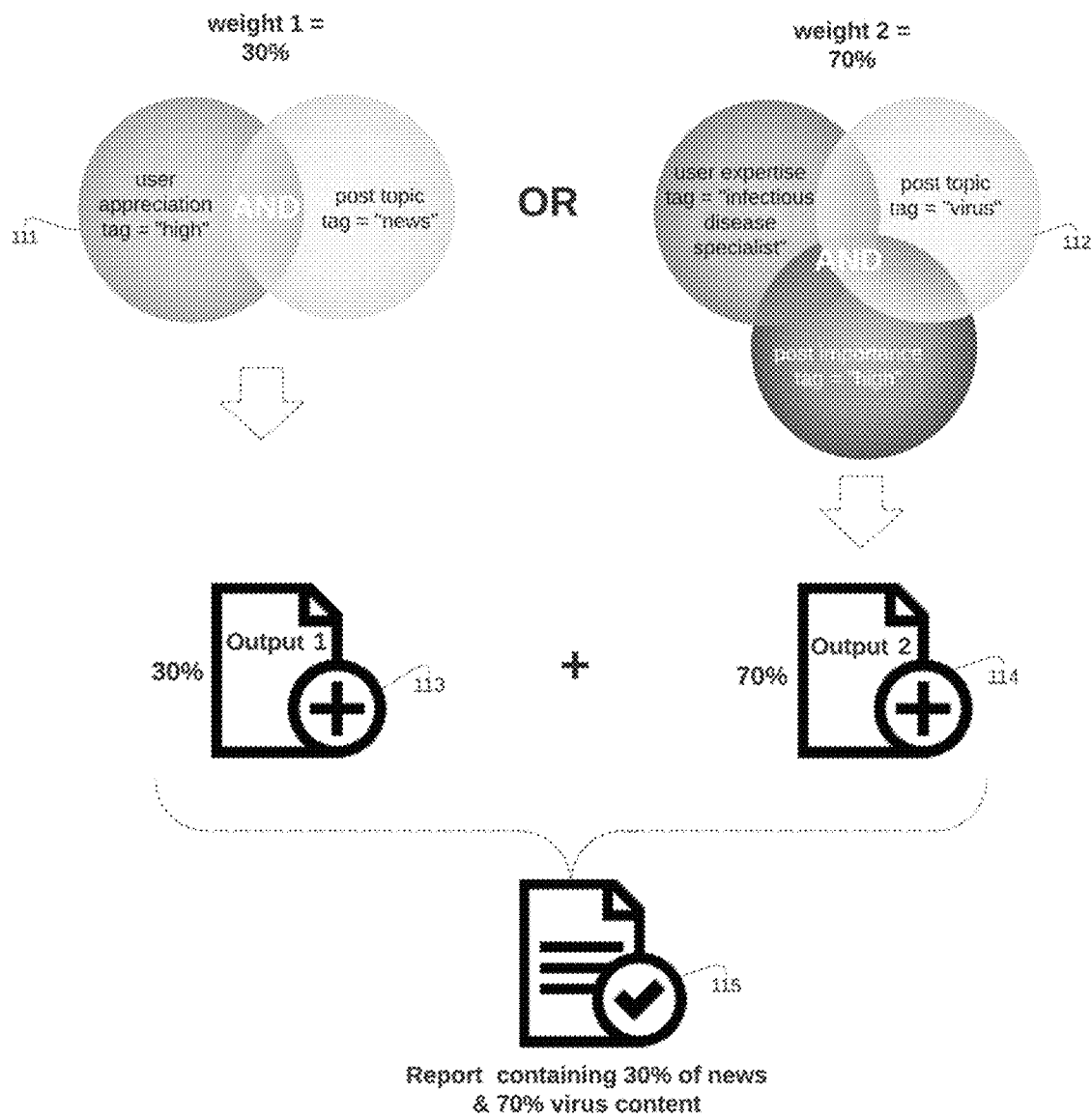
FIG. 19 is the depiction of use of logic gates for generating reports.

Compilation engine receives precisely extracted posts 13 from the logic engine 17 and connects them into meaningful outputs such as interactive, dynamic and/or static views that can be rendered into desired data formats including but not limited to filtered posts grouped and/or sorted as requested, files with pre-defined formats such as notes, agendas, summaries, or charts, graphs and presentations, referred to here as collages. FIG. 16 provides an example of user data request in the text-based filtering portal with logic builder 100 and the inner-working of the logic engine to evaluate the given logic expression, graphically depicting resulting user-post, post-post connections, 103. In this example, user was interested in extracting all posts that scored more than 9 thumbs up or had subject "structures", as well as those posts that were rated "Medium" or "High" by trusted user A. Since the user wanted to see both of these selections at the same time, he/she would have selected logic gate OR. As a result, in this simple example, the requesting user will see {Post 1, Post 2 and Post 3}. However, if the same user wanted to see all posts that scored more than 9 thumbs up AND had subject "structures", he/she would only see {Post 1 and Post 2}. Alternatively, if the user chose to see all posts that scored more than 9 thumbs up AND had subject "structures" AND those posts that were rated "Medium" or "High" by trusted user A, they would see an empty set of posts { }. FIG. 19 shows the Venn diagrams illustrating the action and interaction of logic gates when it comes to generating an output report in the compilation engine 9. The selection criteria for this collage is to extract all posts that relate to topic "news" from the highly appreciated and trusted users 111, combined with all posts on topic "virus" that have been ranked as highly important AND contributed by users who are infections disease specialists 112. Furthermore, this report has an additional requirement for the content to be distributed such that 30% is dedicated to news and 70% to virus posts. The distribution of content is controlled by allocation of weights, where weight can be associated with each AND statement. The result of the former AND statement will result in a set of posts 113, whilst the latter AND statement will generate a set of posts 114. The two sets of posts 113 and 114 are then distributed in the output report 115, as 30:70 ratio respectively. The output of the compilation engine can be either an interactive view or a static report that can be filed for future records. In the interactive view the user can continue to interact with the system in the same way, create or edit tags and their values, display statistics, contribute new posts or reply in thread.

In another aspect of the disclosure a method and system where messaging information, with user-post tag-based categorization system, statistics operators and rule-based filtering results in enhanced system utility, including full project and workflow management functionality as well as real-time polling and rapid surveys.

Messaging platforms allow users to communicate via digital messages that are logically organized into discussion topics and/or discussion threads. Project and workflow management tools facilitate project management processes such as schedule development, team management, cost estimation, resource allocation and risk monitoring. Existing tools typically require project managers to identify the deliverables, stakeholders, tasks, milestones, resources and budget at the onset of the project, when uncertainty in the project is at its highest. However, good practice for creating project plans is to first conduct consultation with the stakeholders and staff, rather than performing this task in isolation. This process reduces the uncertainty and firms up the plans. Ongoing consolation refines the plans. The existing software systems usually require project managers to take notes, summarize the consultative outcomes and then manually enter them as a project task or a milestone. These often lack the required detail and context due to being labor intensive.

We propose a simplified, intuitive and customizable platform that is obtained from the semantic messaging collaboration system described here. The implementation leverages the flexible message tagging granted by the tagging engine 8, logic expression builder in logic engine 17 statistics operators from statistics engine 5 and multiple views generated by the compilation engine to generate project and workflow management functionality enhanced with real time polling and survey features.

The components which typically define project management software functionality include: a task planner—specifying tasks by description, pre-requisites, start date, task duration and resource allocation; task monitoring—visually represented via Kanban boards classifying tasks in categories of "to do", "in progress" and "completed"; project roadmap and time tracking visually managed with Gantt Charts displaying tasks across the timeline including the dependencies; and summary analytics and reporting. Whereas project management is primarily concerned with delivering tasks and projects on time, workflow management systems focus on streamlining business processes to gain efficiencies. These usually contain features such as: role-based access control, defined task priorities, KPI based reporting, overall picture of the workflow and automated notifications.

Here, we will show how we can achieve all of the above mentioned features in the messaging system disclosed, to easily create project and workflow management functionalities. In one embodiment, some of the key enabling tags are predefined in the systems supporting instant use of the project management features, whilst leaving the option for users to further customize these as well as add new supporting tags. The said tags can be associated to users and/or posts in the form of text labels or metatags (advanced tags utilizing statistics operators) that can be used for computing instant statistics pertaining to tasks or resources, polling opinions, or performing other types of statistics over the existing tags. A visual logic engine 17, shown in FIG. 18, enables creation of a plurality of logic expressions that can operate on all, or a subset of tags and metatags. Furthermore, these logic expressions may be stored in the database and named for ease of repeated future use. When these logic expressions are applied to the system database of user and post data, they result in new, customized interactive views which are rendered in the compilation engine 9.

The basic transformation from chat to project and workflow management system is enabled by the following: user-post tagging system comprising ordinary tags describing and abstracting features about users, posts, user-user, post-post and user-post linking data; metatags, which operate on ordinary tags and their values, by invoking the statistics engine as the operator; logic expressions which operate on a plurality of tags and/or metatags joined by logic gates to filter and extract information in dependence upon the logical expressions, and lastly the compilation engine that compiles the extracted information to create new management and advance management views. A management view is a system generated management functionality, such as project management or programming management, that is granted by utilizing P-tags, statistics engine 5, logic engine 17, tag management engine 8 and compilation engine 9. An advanced management view, such as workflow management or survey management, is also a new management functionality, however this time requiring both U-tags and P-tags along with statistics engine 5, logic engine 17, tag management engine 8 and compilation engine 9. To explain the concept of generating new software functionality from the existing messaging system with advance tagging lets focus on two concrete examples: generating project management and workflow management views. To achieve this, in one embodiment of the system, the following post tags could be pre-defined as part of the project and workflow management tagging themes: TAG: task, VALUES: {yes, no}, TAG: task_name, VALUES: {text}, TAG: task_prerequisites, VALUES: {<task_name1>, <task_name2>, . . . , <task_nameM>}, TAG: task_state, VALUES: {'to do', 'in progress', 'for review', 'completed'}, TAG: task_priority, VALUES: {'low', 'medium', 'high'}, TAG: task risk, VALUES: {'low', 'medium', 'high'}, TAG: task background, VALUES: {<task_name>}, TAG: subtask, VALUES: {yes, no}, TAG: subtask_name, VALUES: {text}, TAG: subtask_state, VALUES: {'to do', 'in progress', 'for review', 'completed'}, TAG: subtask_priority, VALUES: {'low', 'medium', 'high'}, TAG: subtask_risk, VALUES: {'low', 'medium', 'high'}, TAG: subtask background, VALUES: {text} TAG: issue, VALUES: {yes, no}, TAG: issue_name, VALUES: {text}, TAG: issue_state, VALUES: {'unresolved', 'resolved'}, TAG: issue risk, VALUES: {'low', 'medium', 'high'}, TAG: start_date, VALUES: {calendar dates}, TAG: duration, VALUES: {integer number}, TAG: link, VALUES: {<task_name1>, <task_name2>, . . . , <task_nameM>}, task_assignment, VALUE: {user X}, TAG: enthusiasm, VALUES: {'low', 'medium', 'high'}, METATAG: enthusiasm_poll, VALUE: {for all users in the team[count(low), count(medium), count(high)]} etc. The default respective values would be set by the system in line with best project management practice. Similarly, tags could be assigned to users to define their roles, responsibilities and/or accountability in the project(s) and team(s), possible values including {administrator, software developer, team manager . . . } A public post TAG: to_do with VALUES={<user1 name>, <user2 name>, . . . , <userN name>} could be predefined for task assignment, and a similar private tag could be utilized for managing personal workload and other 'to-do' lists.

Figure 25:
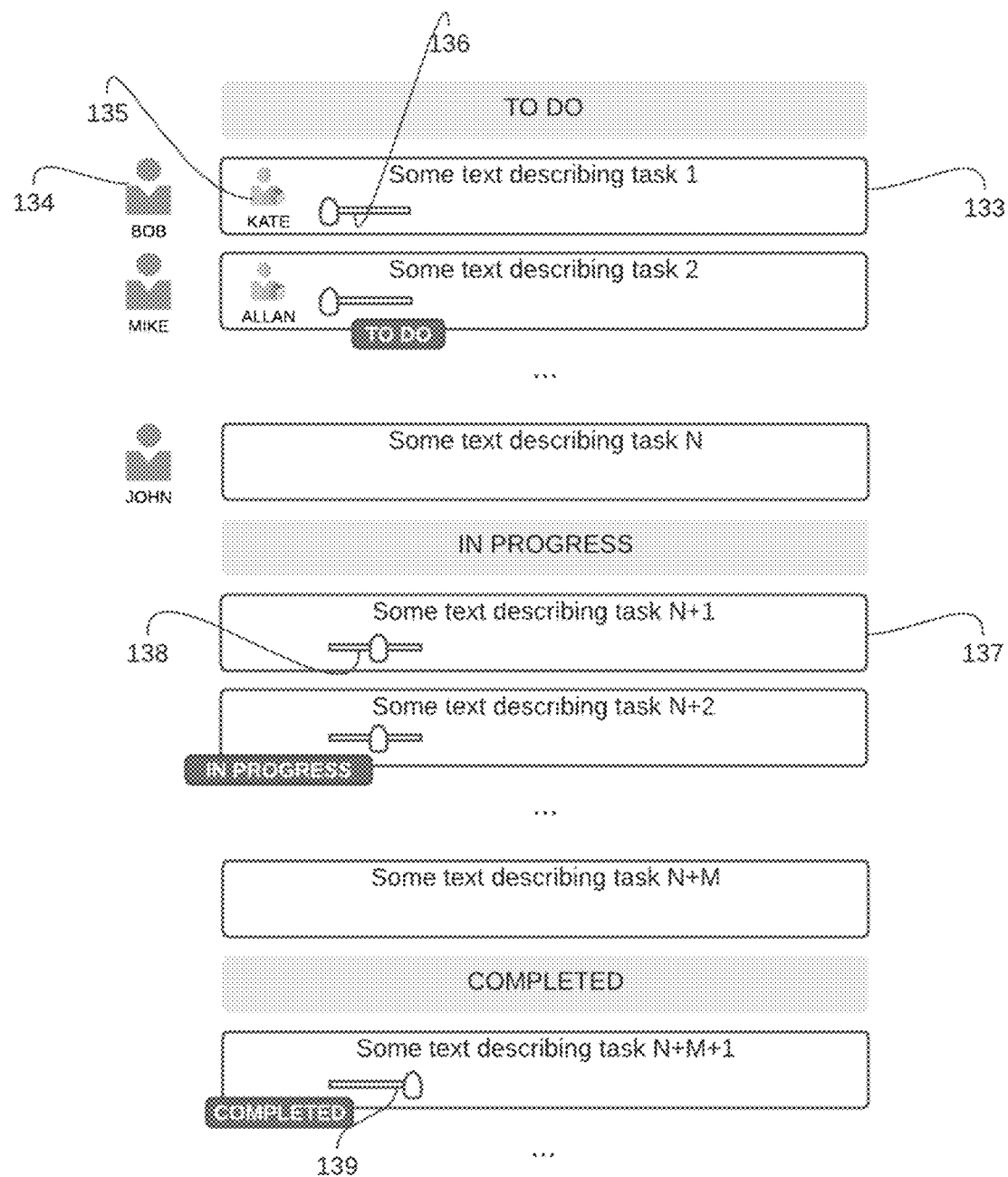
FIG. 25 show illustrates one embodiment of the Kenban Board view.

A project management functionality can be achieved using the pre-defined P-tags, described above, in the following way. Starting with the task planner, the systems would first need to provide a way to generate tasks along with their respective description, pre-requisites, start date, task duration and resource allocation. Task generation can be realized by assigning VALUE: "yes" for the TAG: task on any existing post in the system or alternatively, a new post can be written to instigate the creation of a new task. A TAG:task_name can be given the value in the form of text that meaningfully and uniquely labels the task, where system automatically assists with resolving any possible name conflicts. Furthermore, one or more posts which provide valuable background details about the given task can be associated to the task by setting the TAG: task background to a VALUE:<associate_task_name>. Similarly, any post that refers to a subtask or a task issue can be associated with a plurality of tasks via setting the respective subtask and issue tag values to "yes" and TAG: link VALUE:<associate_task_name>. For example, a post tagged as issue I1 could be linked to two task posts T1 and T2 by adding a TAG: link to the post I1 with values {<T1>,<T2>}. Similarly, posts tagged as risk can be attached to a plurality of tasks. Task start date and duration can be set by assigning appropriate values to TAG: start_date and TAG: duration. Finally to complete the task planner, task pre-requisites are defined as all tasks that precede the given task and need to be completed prior to task start date, this is achieved by setting a TAG: task_prerequisites value to contain names of all preceding tasks and setting the minimum value of the start date tag to the largest end date of all the prerequisite tasks, i.e. min start_time(Task)=max{end_time(pre_req1), end_time(pre_req2), . . . , end_time(pre_reqN)}. From the user's perspective this is achieved by a few clicks in the tag generation portal shown in FIGS. 23 and 24, noting the example displayed there is utilizing a different tagging theme (a programming theme) but it is not hard to imagine substituting the visual with the project management tags described here. Now that the tasks have been fully defined, the task monitoring can be achieved by utilizing the task status tag and a logic expressions builder with the pre-saved logic expression named Kanban board. The expression would simply constitute the following query: TAG: task VALUE='yes' AND sort by tag_status, thus resulting in an interactive view of all post in the system that have been tagged as a task and sorted in groups of "to do" or "in progress" or "completed". FIG. 25 shows one embodiment of this in the Kanban board created in the messaging system. Here, 133 shows a post that has been classified or labeled as Task 1, with the task creator being Bob 134 and where the task has been allocated to Jane 135 via the TAG: task_assignment VALUE="Jane". Under the task description (a post) is an interactive task status tag with a slider icon positioned in the "to do" setting. Similarly in the group of "in progress" posts there is a set of tasks 137 with the slider 138 positioned in the middle section indicating "in progress" status and likewise in the "completed" section the slider is set at the corresponding "in progress" value. This provides users the flexibility to change the status of the task with a simple slide action to change the TAG: task status value, resulting in the task status being automatically updated and task itself relocated to visually appear in the respective like-for-like grouping. Other icon tags can be updated in a similar way by utilizing either a slider ranging between defined numerical and/or qualitative values, or a binary "on/off" button. The project roadmap and time tracking can be realized by using a suite of customizable expressions in the logic builder, including but not limited to: 1) to display all tasks in order when they are due starting from must recent—TAG: task VALUE='yes' AND sort by end_date; 2) to display all tasks and subtasks grouped by tasks—TAG: task VALUE='yes' AND TAG: subtask VALUE='yes' AND sort by task; 3) tasks on a critical path—TAG: task VALUE='yes' AND TAG: task_status VALUE='to do' AND today>TAG start_date value; 4) display high priority tasks—TAG: task VALUE='yes' AND TAG: task_priority VALUE='high' etc. Any of the above or other logic expressions can be saved for reuse as well as viewed in the Chart format by calling upon the compilation engine 9 to render the desired view. Those experienced in the state of the art would implement this feature by simply calling one of the existing chart or graphing libraries, most of which contain the Gantt Chart. The inputs typically required to generate this chart include the attributes specified in each task: task name, start date, and duration. The final view seen in project management tools is the summary analytics and reporting. The former can be achieved by using metatags in the logic expression builder. For example, to display the workload of individual team members a METATAG: task_count can be set up, using a "count" statistics operator on the ordinary post TAG:task. This way a task count would be displayed for each user in real time. In order to visually observe the team's workload distribution, a project manager could elect to see a pre-saved pie chart view of the task count for each of the staff. Similarly, other views can be generated utilizing tags, metatags, logic expression builder and charting libraries. Finally, any interactive view can also be exported in a static format such as pdf or other type of document thus catering to reporting functions of the project management system. Thanks to this configuration, the project managers would not need to generate plans in isolation from a blank page, as the initial project plan would be automatically created by the system, leveraging team conversations from the chat component as well as advanced tagging system. With some direction from the manager, and utilizing existing and customizable tagging features, the conversation can be directed for better, more efficient results. In general, the messaging platform enables transparent team communication, voicing requirements, concerns, challenges, dependencies, availabilities, enthusiasm and more, all of which can be appropriately and flexibly tagged, if decided they should be acted upon. The conversations provide a starting point for generating schedules and ample context details for tasks, issues, milestones, potential risks and mitigation strategies. Any new information that is shared on the platform can automatically influence and/or update all system views.

The workflow management view usually contains features such as: role-based access control, defined task priorities, KPI based reporting, overall picture of the workflow and automated notifications. To enable role-based access control the system needs to pre-define a user TAG: user_role VALUE: {admin, engineer, manager, finance, chief, etc.} The role-based control can then be enabled based on this tag value. Furthermore, all saved searches, in the logic engine 17, pertaining to a user with specific user role, could be customized within the logic expression in the logic engine 17, to generate further customized, role-based views. The task priorities are defined by the post TAG:task_priority. In workflow management tools, KPI based reporting is typically executed via forms that define organisation's process paths. In the system disclosed here, we can achieve the same with controlled views. For example, if the review process involved the following sequence of approvals: Engineer-→Manager→Finance→Chief then based on user roles the chief would only see tasks that have already been approved by the finance officer by using the saved Chief approval view implemented with a logic expression like: (user_role=Chief AND user TAG:task_status="for review") AND (user_role=Finance AND TAG:task_status="completed".)

Note, here we assumed that the organization had only one chief and one finance officer, if this is not the case then user names could be used instead. Similarly, the Finance officer would only see the tasks that have been already approved by the manager and he/she those tasks approved by the engineer. The review can get reverted back to previous authority by making the task status tag public sharable between two consecutive reviewing levels. For example, chief could have authority to change the task status on behalf of the finance office and finance officer would have the right to change the status for the manager etc. This way the task would require the subordinate to revise their review before they send it up for the next level of review. Therefore, instead of using complex forms, the same can be achieved in the visual logic builder and using a simple chat interface with visual interactive tags, such as slider for changing task status. In order to gain preview of the overall picture, various summary statistics could be set up utilizing metatags. For example, we mentioned earlier a user METATAG: task_count that tallies all the tasks for each user, resulting in a workload and work distribution view. Alternatively, a view with high priority tasks distribution can be set by saving the following logic expression for each user: user=Bob AND user METATAG: task_count AND TAG:task_priority="high", then a chart can be displayed, using a compilation engine 9, to display all high priority tasks for each user. Finally, a post can be classified as a notification by adding a post TAG:notification, VALUE="yes" and assigning a notification name via post TAG: notification_name with a description as a text value. The user can then decide to automate sending of specific notifications, which in this case will appear to the user like another message, however instead of a user it would be generated by the system.

Figure 20:
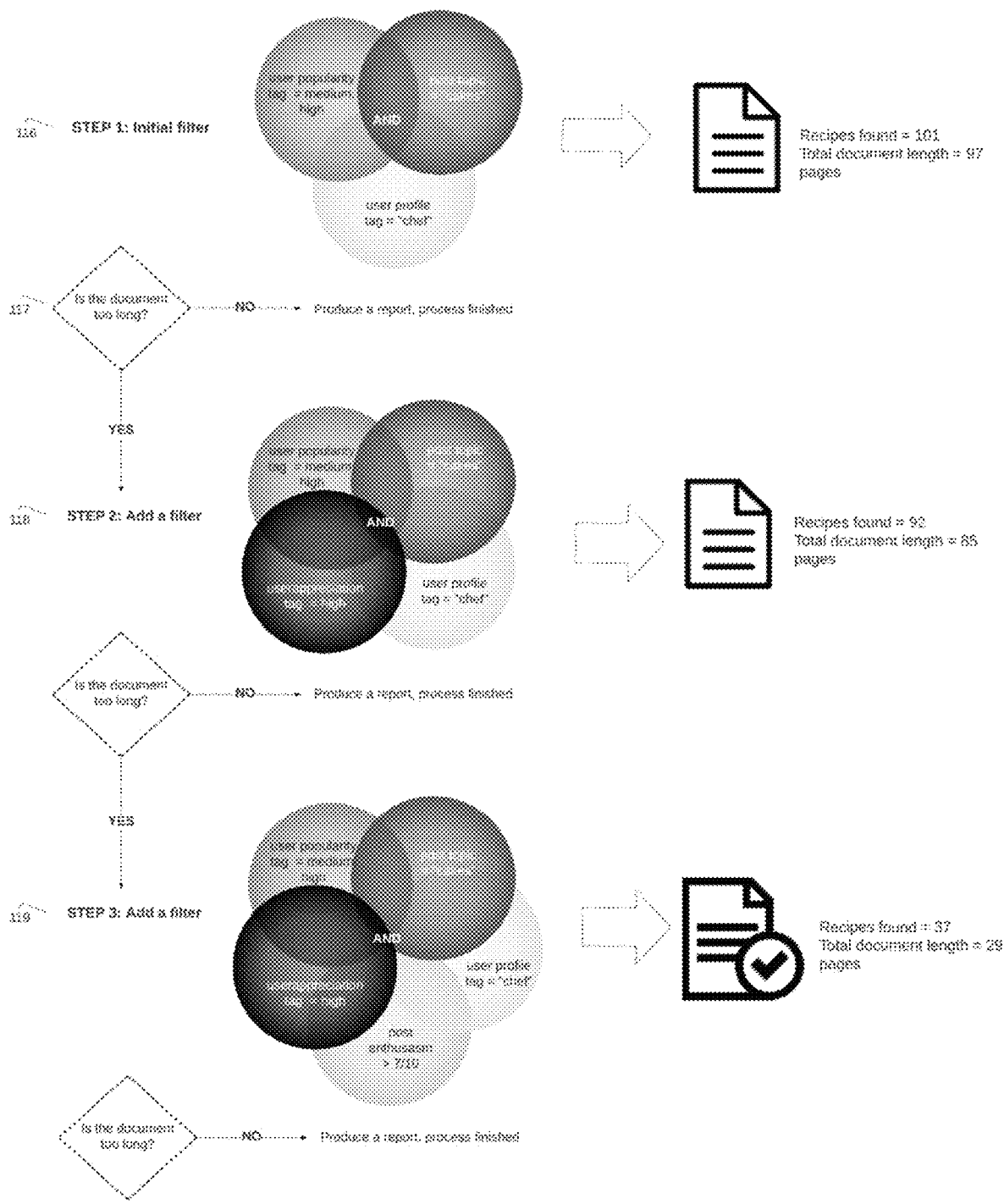
FIG. 20 feedback procedure for controlling the length of the output document.
Figure 21:
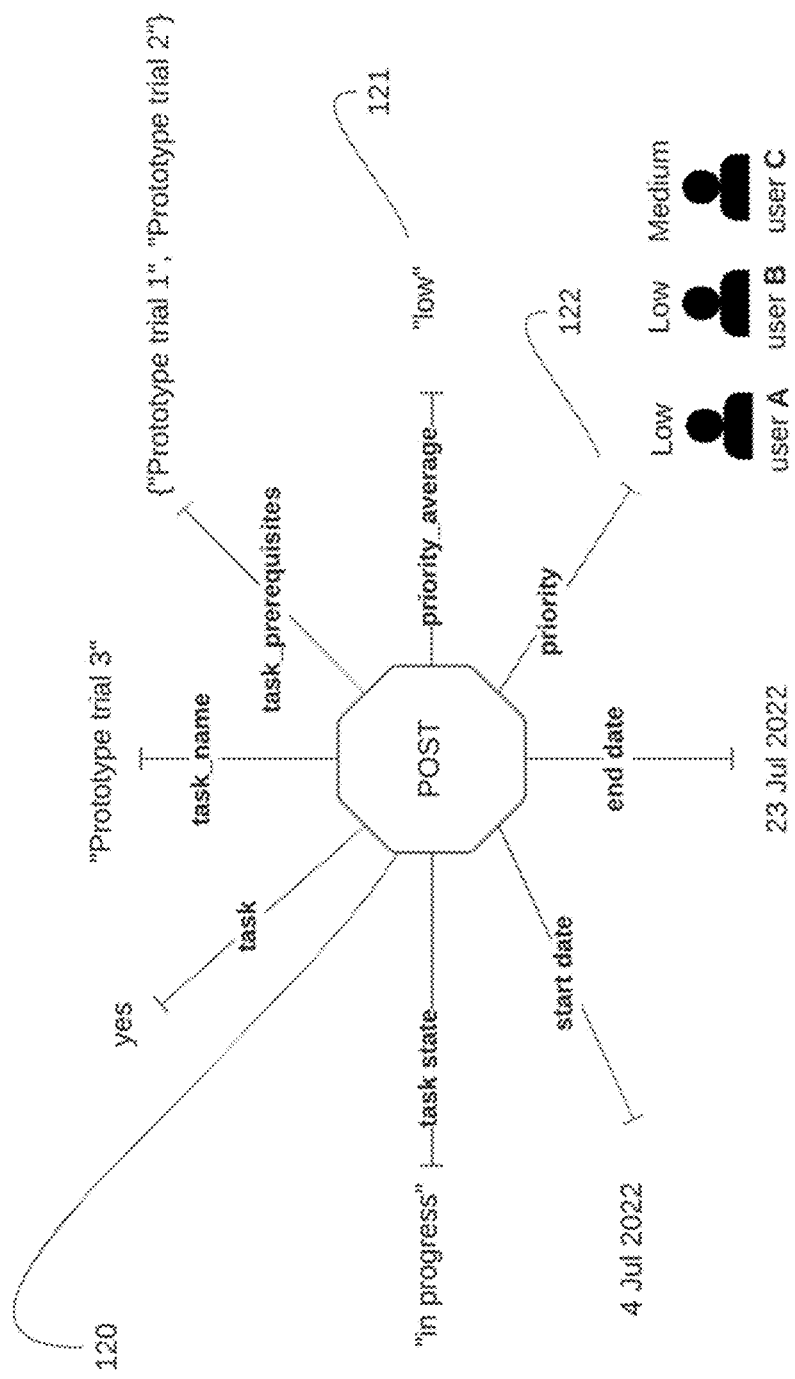
FIG. 21 is the depiction of a typical post neuron classified as a task.
Figure 22:
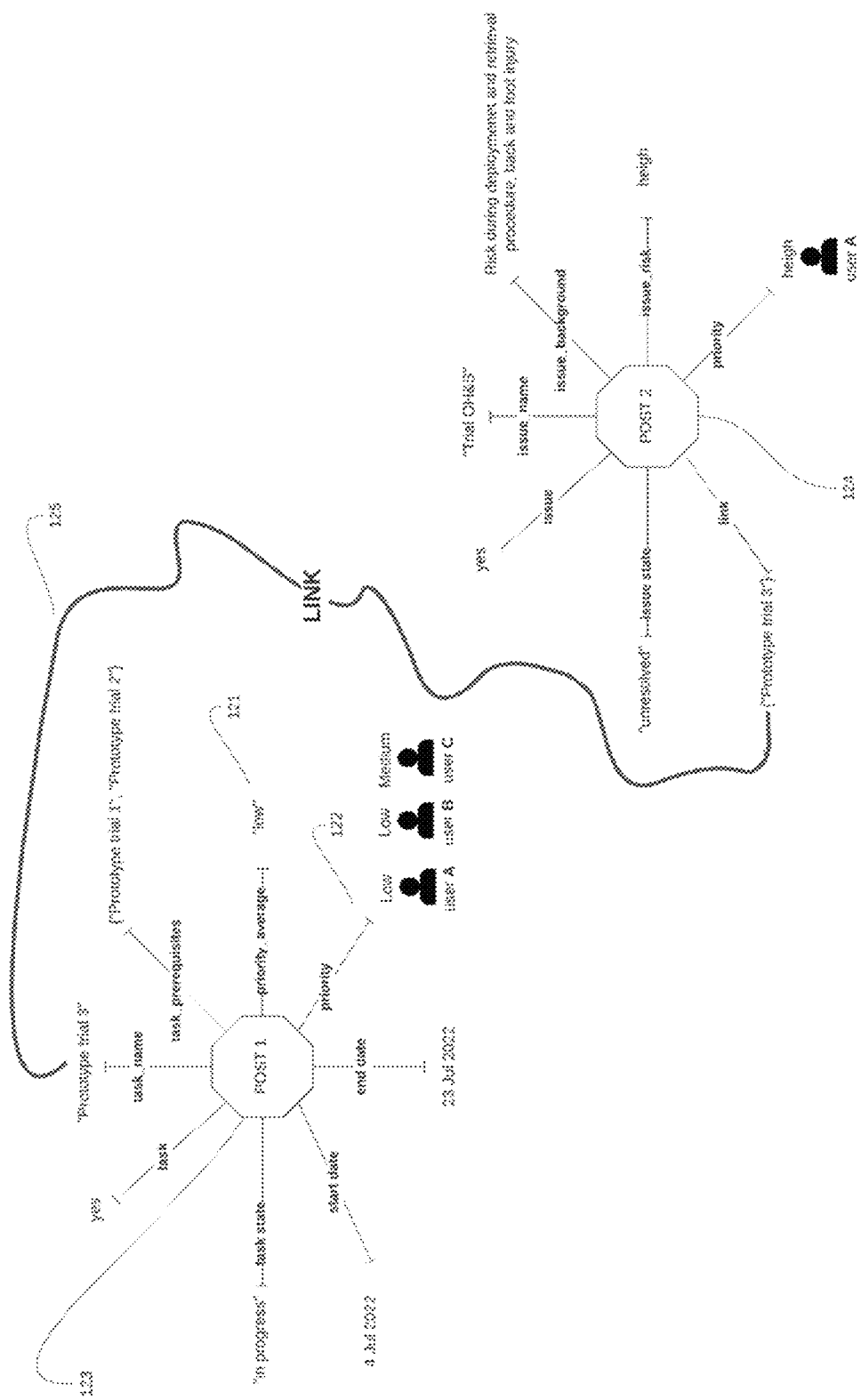
FIG. 22 illustrates how an issue post is connected to a task post.

To illustrate the workings behind scenes for the project and workflow management tagging themes, please refer to FIG. 20. Here, a typical post neuron 120 has been classified as a task. In this example post 120 was entered by one of the users of the system. It determined that this post would constitute a task and hence a tag task was assigned value yes; in practice it's executed with a simple click via the post-tagging interface, and given a task name "Prototype trial 3". The prerequisite tasks were then connected via a task_prerequisites tag to insure the task can only commence after "Prototype trial 1" and "Prototype trial 2" have been completed. The start and end date have been specified via respective tags as 4 Jul. 2022 and 23 Jul. 2022. The priority tag 122 is an ordinary tag that has been given the following possible values {low, medium, high}. The team of three users A, B and C were asked to contribute their view on the priority of this task and the average priority level was collected via a metatag called priority average 121. Let us define vA as the priority value assigned by user A, vB priority value assigned by user B and vC priority value assigned by user C. The metatag priority_average calls upon the statistics engine 5 to apply the statistics operator "average" on the values of the ordinary tag priority 122, contributed by the users A, B and C. Therefore METATAG: priority_average=average(vA, vB, vC). Another example is shown in FIG. 22 where an issue post 124 is being connected to a task post 123. In this example post 1 has been tagged as a task called "Prototype trial 3" and post 2 124 has been tagged as an "OH&S" issue. Because post 2 124 is relevant to post 1 123 a link 125 is created via a tag link to connect the task post 123 with the issue post 124. This association enables managers and other users to view all relevant issues to the given task. Similarly other posts pertaining to task background or risks could be likewise associated with the task.

Therefore, the above is an example of implementation that achieves full operational requirement for the project management and workflow management views with a single system. Likewise, the system could be extended to cater for accounting management, finance management, programming management, polling and survey management and many other views. The premise being that users have the power to generate their own systems, allowing society and humanity to evolve innovative solutions together in a way that is intuitive, rather than subscribe to pre-defined systems with little control and need for continually learning and handling multiple platforms.

In summary, this system configuration enables team members to operate solely via a chat platform in an intuitive human way, and without ever seeing the management views unless they choose to do so. That is, the user is unburdened of information that is not relevant to them or learning to use new software features, enabling them to focus on their specific contribution in the most efficient ways. Therefore, the user's interest and focus is allowed to be contained only within their own tasks and prioritizing their personal workload. The system dependencies are communicated to them automatically by the system or by a project manager via simple chat messages generated by the NLP engine 6 (optional). On the other hand, the managers, are granted the integrated view of chat and management views and relived of large volumes of manual inputs and errors due to being lost in translation or transition of information. The managers are now previewed to capturing communal intelligence via polling and other statistics metatags, as well as easily linking relevant conversations to tasks for background information, context and tracking.

What is claimed is:

1. A computer implemented messaging and management system for organizing and extracting information sent between users, and for automatically generating and updating management data based on information extracted from messages, comprising:
   a) a plurality of storage devices;
   b) a network interface in signal communication with the plurality of storage devices, configured to receive and store a plurality of posts, and post relational data, wherein a post is a message that comprises at least one of text, speech, graphics, and video, or any combination thereof, wherein post relational data relates information associating posts with other posts;
   c) one or more processors configured to access the plurality of the posts and post relational data and configured to generate a set of P-tags from the received posts and post relational data, wherein a P-tag is a tag associated with one or more posts or a post and a user, and wherein the set of P-tags have associated therewith a plurality of tagging themes, wherein a tagging theme is a logical grouping of tags, wherein each P-tag has a value associated therewith, wherein some of the values are derived from one or more users' input and wherein some of the values are generated by a tag management engine and a statistics engine;
   d) a logic engine having logic gates for grouping the P-tags with associated values or P-tags with associated values and keywords into a plurality of logic expressions; and,
   e) a compilation engine for creating and displaying one or more management views in dependence upon the plurality of logic expressions.

2. The computer implemented messaging and management system as defined in claim 1, wherein the network interface in signal communication with the plurality of storage devices is further configured to receive and store data related to users, user-post linking data and user relational data, and wherein the one or more processors is configured to access the data related to users, user-post linking data and user relational data and is configured to generate a set of U-tags from the received data related to users, user-post linking data and user relational data; wherein user relational data associates users with other users and user post linking data associates users with posts; wherein each U-tag has a value associated therewith, wherein some of the values associated with U-tags are derived from users' input and where some of the values associated with U-tags are generated by the tag management engine and the statistics engine, wherein the logic engine having logic gates is for grouping the U-tags with associated values into a plurality of logic expressions; and, wherein the compilation engine is for creating and displaying one or more advanced management views in dependence upon a plurality of logic expressions.

3. The system as defined in claim 1 wherein the management system is a project management system and wherein the one or more management views are one or more project management views.

4. The system as defined in claim 2 wherein the management system is a workflow management system and wherein the one or more advanced management views are one or more workflow management views.

5. The system as defined in claim 2 wherein the management system is a survey or polling management system and wherein the one or more advanced management views are one or more survey or polling views.

6. The system as defined in claim 1 wherein the logic engine further comprises a statistics operator.

7. The system as defined in claim 1 wherein at least some tags are metatags.

8. A computer implemented method for organizing and extracting information sent between users, and for automatically generating and updating management data based on information extracted from messages, comprising:
   receiving on a network interface in signal communication with a plurality of storage devices a plurality of posts, and post relational data, wherein a post is a message that comprises at least one of text, speech, graphics, and video, or any combination thereof, wherein post relational data relates information associating posts with other posts;
   with one or more processors configured to access the plurality of the posts and post relational data, generating a set of P-tags from the received posts and post relational data, wherein a P-tag is a tag associated with one or more posts or a post and a user, and wherein the set of P-tags have associated therewith a plurality of tagging themes, wherein a tagging theme is a logical grouping of tags, wherein each P-tag has a value associated therewith, wherein some of the values are derived from users' input and wherein some of the values are generated by a tag management engine and a statistics engine;

grouping the P-tags with associated values or P-tags with associated values and keywords into a plurality of logic expressions utilizing a logic engine having logic gates; and, creating and displaying one or more management views in dependence upon at least some of the plurality of logic expressions utilizing a compilation engine.

9. The computer implemented messaging and management method as defined in claim 8, further comprising:

receiving and storing data related to users, user-post linking data and user relational data;

accessing the data related to users, user-post linking data and user relational data and generating a set of U-tags from the received data related to users, user-post linking data and user relational data with the one or more processors, wherein user relational data associates users with other users and user post linking data associates users with posts, wherein each U-tag has a value associated therewith, wherein some of the values associated with U-tags are derived from users' input and where some of the values associated with U-tags are generated by the tag management engine and the statistics engine, grouping the U-tags with associated values into a plurality of logic expressions utilizing the logic engine having logic gates; and, creating and displaying one or more advanced management views in dependence upon at least some of a plurality of logic expressions utilizing the compilation engine.

10. A non-transitory computer readable medium comprising program instructions stored thereon for organizing and extracting information sent between users, and for automatically generating and updating management data based on information extracted from messages, and for causing a computer system having one or more processors and storage devices to:

receive and store a plurality of posts, and post relational data, wherein a post is a message that comprises at least one of text, speech, graphics, and video, or any combination thereof wherein post relational data relates information associating posts with other posts;

access the plurality of the posts and post relational data and generate a set of P-tags from the received posts and post relational data, wherein a P-tag is a tag associated with one or more posts or a post and a user, and wherein the set of P-tags have associated therewith a plurality of tagging themes, wherein a tagging theme is logical grouping of tags, wherein each P-tag has a value associated therewith, wherein some of the values are derived from users' input and wherein some of the values are generated by a tag management engine and a statistics engine;

group the P-tags with associated values or P-tags with associated values and keywords into a plurality of logic expressions utilizing a logic engine having logic gates; and, create and display one or more management views in dependence upon at least some of the plurality of logic expressions utilizing a compilation engine.

11. A non-transitory computer readable medium as defined in claim 10 wherein the program instructions further cause the computer system having one or more processors and storage devices to:

receive and store data related to users, user-post linking data and user relational data;

access the data related to users, user-post linking data and user relational data;

generate a set of U-tags from the received data related to users, user-post linking data and user relational data wherein user relational data associates users with other users and user post linking data associates users with posts; wherein each U-tag has a value associated therewith;

derive some of associated with U-tags from users' input;

generate some of the values associated with U-tags using the tag management engine and the statistics engine;

group the U-tags with associated values into a plurality of logic expressions utilizing the logic engine having logic gates;

create and display one or more advanced management views in dependence upon at least some of a plurality of logic expressions utilizing a compilation engine.

12. The non-transitory computer readable medium as defined in claim 10 wherein the computer system is a project management system and wherein the one or more management views are one or more project management views.

13. The non-transitory computer readable medium as defined in claim 11 wherein the computer system is a workflow management system and wherein the one or more advanced management views are one or more workflow management views.

14. The non-transitory computer readable medium as defined in claim 11 wherein the computer system is a survey or polling management system and wherein the one or more advanced management views are one or more survey or polling views.

15. The non-transitory computer readable medium as defined in claim 10 wherein the logic engine further comprises a statistics operator.

16. The non-transitory computer readable medium as defined in claim 10 wherein at least some tags are metatags.

* * * * *